(12) United States Patent
Chamley et al.

(10) Patent No.: US 6,804,786 B1
(45) Date of Patent: Oct. 12, 2004

(54) USER CUSTOMIZABLE SECURE ACCESS TOKEN AND MULTIPLE LEVEL PORTABLE INTERFACE

(75) Inventors: Cathryn Anne Chamley, Eastwood (AU); Zhi-Lei Wang, Westmead (AU); Sue-Ken Yap, Lane Cove (AU); Zhenya Alexander Yourlo, Roseville (AU)

(73) Assignee: Canon Kabushiki Kaisha, Tokyo (JP)

( * ) Notice: Subject to any disclaimer, the term of this patent is extended or adjusted under 35 U.S.C. 154(b) by 585 days.

(21) Appl. No.: 09/657,153

(22) Filed: Sep. 7, 2000

(30) Foreign Application Priority Data

Sep. 10, 1999 (AT) .............................. PQ2756
Sep. 29, 1999 (AT) .............................. PQ3141

(51) Int. Cl.⁷ .............................. H04L 9/32
(52) U.S. Cl. ............... 713/201; 713/159; 713/182; 713/185; 705/65; 235/380
(58) Field of Search .................. 713/159, 172, 713/182, 185, 193, 200, 201; 705/53, 64, 65; 708/135; 711/163; 235/380, 492, 493; 902/25, 26, 27, 28, 29

(56) References Cited

U.S. PATENT DOCUMENTS

| 5,002,062 A |   | 3/1991 | Suzuki | ................. | 128/696 |
| 5,191,611 A | * | 3/1993 | Lang | ..................... | 705/53 |

(List continued on next page.)

FOREIGN PATENT DOCUMENTS

| AU | 742974 | 4/2000 | ............ G06F/3/23 |
| DE | 3637684 A1 | 5/1987 | ........... G06F/15/04 |

(List continued on next page.)

OTHER PUBLICATIONS

U.S. patent application Ser. No. 09/414,558, filing date Oct. 8, 1999.

U.S. patent application Ser. No. 09/925,093, filing date Apr. 21, 1999.

*Primary Examiner*—Justin T. Darrow
(74) *Attorney, Agent, or Firm*—Fitzpatrick, Cella, Harper & Scinto

(57) ABSTRACT

Disclosed is a smart card device having a surface onto which are formed a plurality of user interpretable icons and electronic apparatus attached to the card portion. The electronic apparatus includes a memory in which are retained at least a plurality of character strings each associated with a corresponding one of the icons, a processor means coupled to the memory means, and communication means for coupling the processor means to a reading device configured to facilitate reading of the secure access device. The processor means is configured to relate reading signals generated from a user selection of at least one of the icons and received via the communication means with at least one of the retained character strings to thus perform a secure access checking function for enabling or rejecting user access to a desired service. Also disclosed is a multiple level user interface card for interfacing between a user provided with a card reader communicating with a computer and an application program having a multiplicity of hierarchical operating or ordering levels operating on, or operated by, the computer. The card comprises a smart card or interface card (known per se) having a plurality of user activatable regions thereon and an electronic memory with data stored therein corresponding to each of the regions. Then regions and the data are arranged in a hierarchy with a multiplicity of levels corresponding to the application program levels, and each level has a plurality of regions. Selection of a region of each level in the sequence of the hierarchy activates the stored data in the hierarchical sequence to operate, the application program at the operating or ordering level corresponding to the last selected region.

39 Claims, 14 Drawing Sheets

U.S. PATENT DOCUMENTS

| | | | |
|---|---|---|---|
| 5,276,311 A | 1/1994 | Hennige | 235/380 |
| 5,353,016 A | 10/1994 | Kurita et al. | 340/825.22 |
| 5,396,558 A * | 3/1995 | Ishiguro et al. | 705/67 |
| 5,601,489 A | 2/1997 | Komaki | 463/44 |
| 5,857,023 A | 1/1999 | Demers et al. | 380/24 |
| 5,937,068 A | 8/1999 | Audebert | 380/23 |
| 5,949,492 A | 9/1999 | Mankovitz | 348/473 |
| 5,973,475 A | 10/1999 | Combaluzier | 320/107 |
| 6,014,593 A | 1/2000 | Grufman | 700/136 |
| 6,229,694 B1 | 5/2001 | Kono | 361/683 |
| 6,325,292 B1 * | 12/2001 | Sehr | 235/492 |
| 2001/0017616 A1 | 8/2001 | Kobayashi | 345/173 |

FOREIGN PATENT DOCUMENTS

| | | | |
|---|---|---|---|
| EP | 0 469 581 A2 | 2/1992 | G06F/15/02 |
| JP | 59-123986 A | 7/1984 | G06K/15/02 |
| JP | 04-88547 A | 3/1992 | G06F/15/02 |
| JP | U03-071329 U | 6/2000 | G06F/3/00 |
| WO | 95/35534 A1 | 12/1995 | G06F/3/023 |
| WO | WO96/32702 A1 | 10/1996 | G07F/7/10 |
| WO | WO 9843431 A1 * | 10/1998 | H04N/7/167 |
| WO | WO 9924948 A1 * | 5/1999 | G08B/1/08 |

* cited by examiner

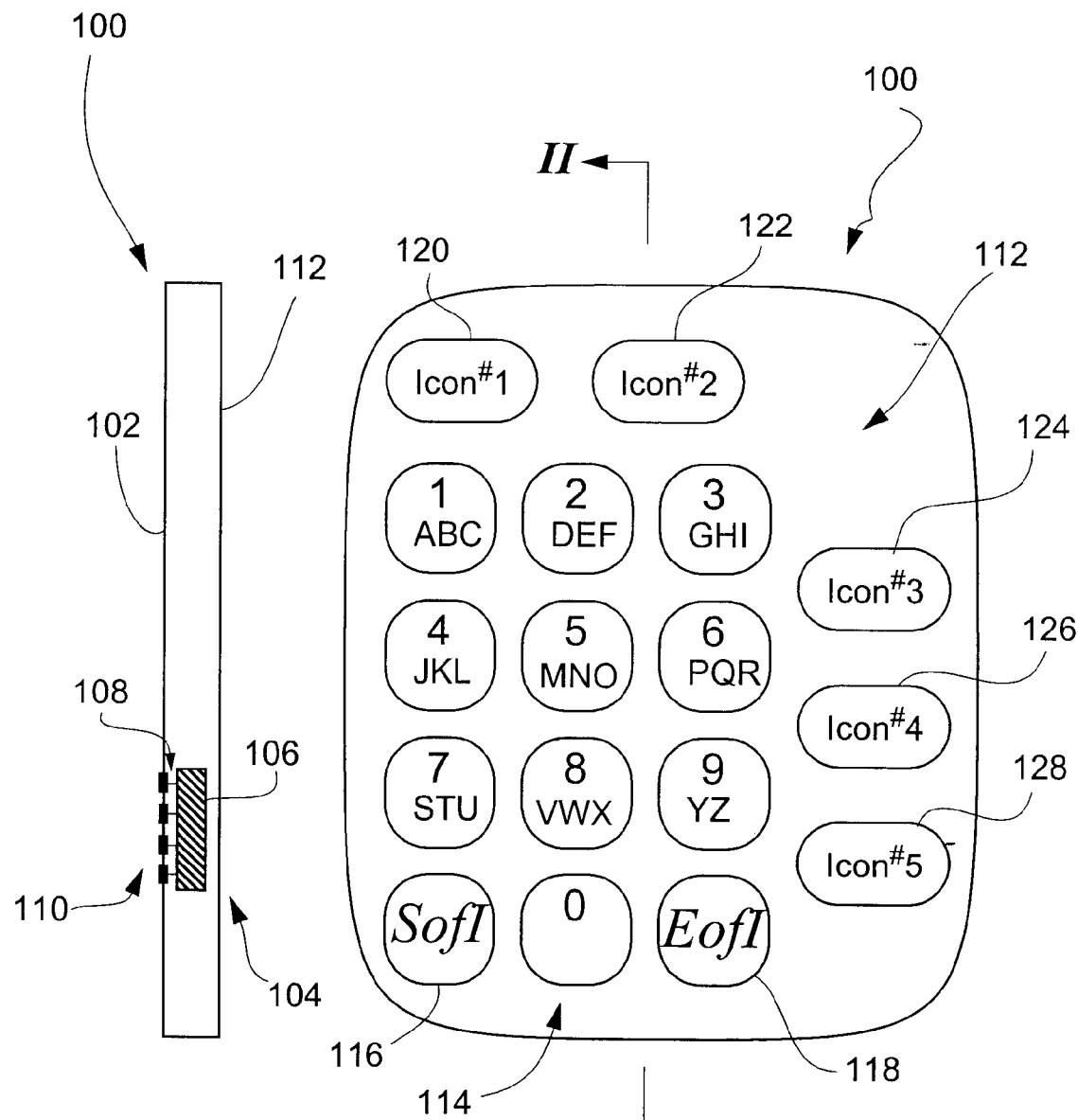

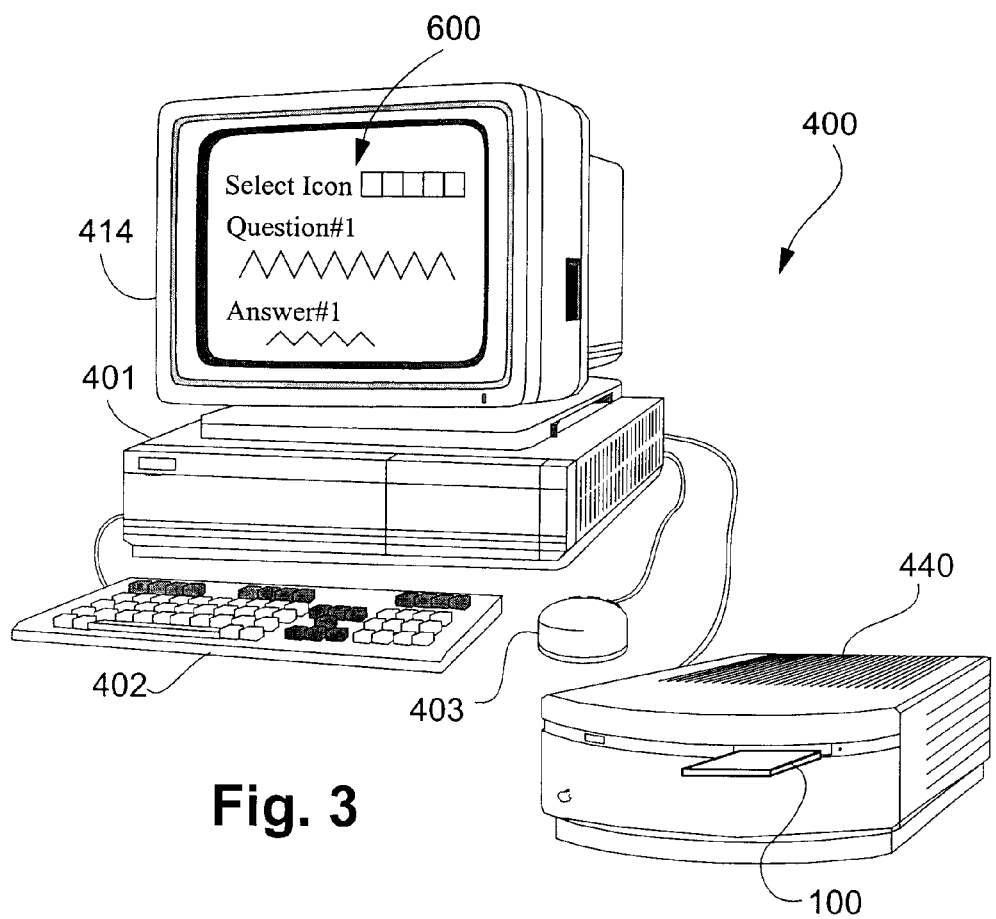
Fig. 3
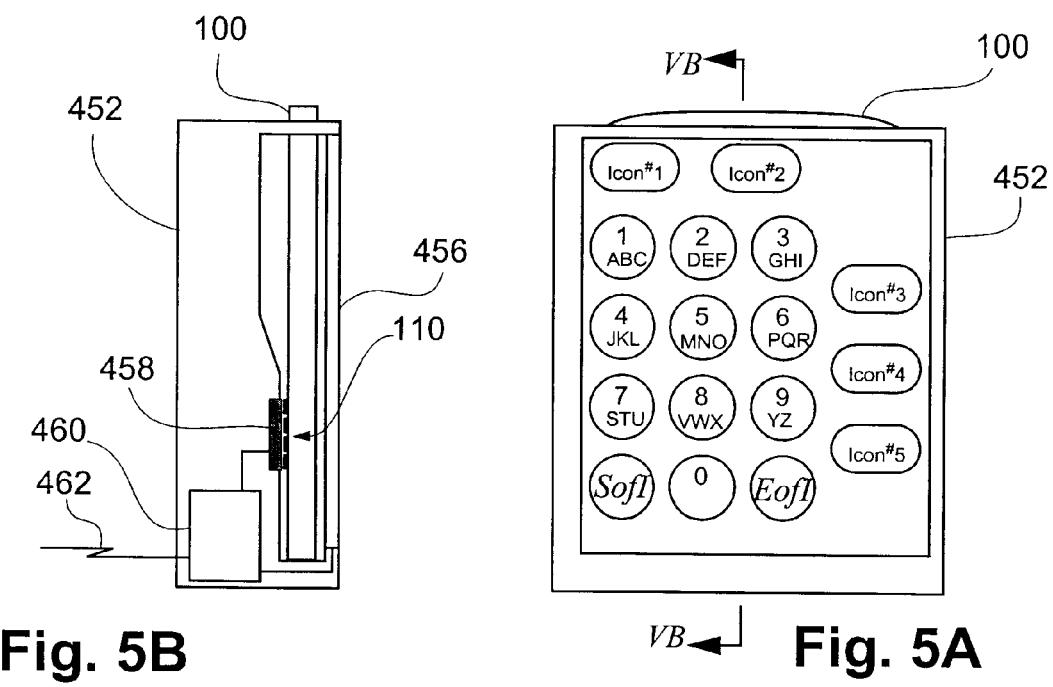
Fig. 5B  Fig. 5A

USER CUSTOMIZABLE SECURE ACCESS TOKEN AND MULTIPLE LEVEL PORTABLE INTERFACE

FIELD OF THE INVENTION

The present invention relates to systems enabling access of users to services and, in particular, to an arrangement that allows a user to create a customisable access token for such services and to the fast retrieval of multiple level information from customized cards. The invention has been developed primarily for secure access to digital services and will be described hereinafter with reference to these and related applications. However, it will be appreciated, particularly in view of the number of alternative examples given, that the invention is not limited to these fields of use.

BACKGROUND ART

In the provision of digital services to users, access is typically controlled by some secret that is shared between the user and the provider of the service. This secret is often known by names such as a "key", a "password", a "personal identification number" (PIN) and so forth.

The security level associated with the provision of the service is typically enhanced through the use of lengthy or complicated secrets. Unfortunately, people are typically poor at remembering long or complex secrets and such secrets are also cumbersome to input to some checking system. As a consequence, secrets that are shared amongst a small group of people tend to be short, for example four or six digits in length. Such results in lower levels of security than is desirable. This is particularly the case in the realm of services accessed via computer through the Internet where unscrupulous persons can mount an automated attack upon the provision of the service or the service itself. This is to be contrasted with automatic teller machines where the gateway to the service is controlled by the provider of the service (eg. the bank).

One way to increase the security level without requiring individuals to remember long secrets, is to store the secret in some convenient form, for example in a smartcard device, known per se. In the context of this specification, such smartcard devices relate to those devices which contain a computing capacity within the device and not merely the simple "memory only" smartcard devices commonly used as telephone cards and for other basic applications. An example of a device including a computing capacity that is currently available is the "JavaCard" manufactured by Schlumberger Industries of France.

To protect the smartcard device from unauthorised use by a thief or other unscrupulous person, such devices are generally configured to require a short secret (eg. a PIN) to be entered prior to use being enabled. An example of a similar such device currently in use are credit-card sized organisers that can hold many passwords, all protected by a master password (eg. the PIN) arranged on the organiser. These devices are often used by administrators of computer systems who are required to remember many passwords. However, such an arrangement is quite vulnerable to compromise because if an attacker can obtain the device, an attack can be mounted upon it. The only change from the previous case being that the channel between the user and the service is more secure because longer secrets are used in such an arrangement. The weak link in the security arrangement is the secret implemented by the user to obtain access to the service (eg. the master PIN).

It is known to those skilled in the computing sciences that the need for a user and the service to share a secret can be removed by using public-key cryptography. The user holds the private half of the key-pair and the service (in fact the world in general) may be given the public half of the key-pair. The service authenticates the user by issuing a challenge to the user's input by requesting a known datum to be encoded by the user's key. If the encoded datum can be decoded correctly by the service issuing the user's public key, then provided the user has kept the private key a secret, it can then be said, with a very high level of confidence, that the user is authentic. Such a scheme makes a device having a computing capacity mandatory because humans cannot perform the arithmetic operations required for authentication at an appropriate speed. Advanced smartcards, such as the smartcards discussed above, having a computing capability can provide such capacity.

There still remains the problem of how to adequately protect the private key held in such a smartcard.

It has been proposed to use a scheme where a user is posed a series of questions relating to the user's personal history. For example, "my most memorable moment was in . . . ", where the user is expected to fill in a geographic location of the "memorable moment". Another example includes "the day Kennedy died, I was . . . ". In this example, any attacker to the system has no knowledge as to which Kennedy is meant by the user. In such systems, the assumption is that an attacker would not know the answers to a sufficiently large number of obscurely phrased questions relating to the user's personal history. In contrast, the user would know the answers to such questions and would remember those answers well because they are in some way significant in the user's mind. Such an arrangement may provide some leeway for incorrect answers to be entered thereby permitting access to the service provided a sufficiently large number of correct answers are returned by the user. The security scheme just described has the disadvantage that a computer and an input device, such a keyboard, are required to provide implementation. Such reliance upon relatively large devices inhibits broader use of digital services, especially in electronic commerce, where the user may not wish to trust the computer being used by the service provider, but also does not wish to carry a computer and associated input device.

Complex computer systems used in everyday life today make use of multiple levels of interaction to make computer applications substantially simpler to navigate. Users typically must navigate through multiple levels of interaction to locate information or perform operations that are of interest. Content retrieval applications generally organize content in a tree or hierarchical type structure and allow navigation to more detailed "branches" on the tree. Searching methods and associated software are typically provided to guide the user through various levels of the tree to a desired node thereof. Similarly, there are many computer applications which perform a task, where that task is specified by a number of key presses or menu choices. It is the combination of these key presses or menu choices which specifies the form of task to be performed. Thus a complex task can be completed through a number of simple key presses or menu options. Many navigating techniques and navigating engines are known in the prior art and are available for use in performing this process.

However, these prior art approaches have several drawbacks which can make it difficult to effectively locate the desired materials or operations. One disadvantage is that applications are likely to provide only first level entries which are apparent to the user. Available navigation paths are unknown to the user before navigation commences, can thus become easily confused as to which level he is currently on, and how many levels are left to be traversed before the destination is reached. In addition, the user may also be unaware of which button(s) is/are enabled and which is/are disabled until a button is pressed and a response is received. If the application makes use of a standard keyboard layout and mouse pointer, it is likely that only a small minority of the available keys will be mapped to functions. Thus, some prior knowledge of the mapped keys is needed in order to reduce frustration, unless very clear instructions are given. The resulting user interface is therefore not simple to use and assumes some experience or knowledge from the user.

Apart from the lack of pre-shown searching paths on a fixed user interface, another disadvantage is that user interfaces keep changing. This is especially evident in many menu driven graphical user interfaces (GUI's), which are often used to minimize the amount of prior expertise necessary to use an application. Such interfaces can alter the display of the menus shown depending on the state of the application. Menu options that have no prescribed effect at a given time are often removed or greyed out. Information may be presented and retrieved during routing through all entries, which may confuse the user with changing content, and can also be slow. It would be more efficient if less detailed indications or guidelines were needed to be presented prior to reaching the tree index leaf nodes.

Yet another disadvantage of the prior art is that a specific user interface or interface device is generally required for each application. Fixed interface and special requirements make it difficult to create a device which can generate a customized user interface coupled to numerous applications.

Smart cards and interface cards having user selectable indicia and which do not have any levels suffer from the problem that a limit to the number of different actions which can be accessed is quickly reached. One limit is the size of the tip of the human finger which determines a minimum size for the indicia or associated button. Another limit is the size of the card itself. For a credit card size, a smartcard a limit of about 20–30 icons/indicia is quickly reached.

SUMMARY OF THE INVENTION

It is an object of the present invention to substantially overcome or ameliorate one or more problems associated with prior art arrangements.

In accordance with one aspect of the present disclosure there is provided a secure access device comprising:

a card portion having a surface onto which are formed a plurality of user interpretable icons; and electronic apparatus attached to said card portion, said apparatus comprising:

a memory in which are retained at least a plurality of character strings each associated with a corresponding one of said icons;

processor means coupled to said memory means; and communication means for coupling said processor means to a reading device configured to facilitate reading of said secure access device;

wherein said processor means is configured to relate reading signals generated from a user selection of at least one of said icons and received via said communication means with at least one of said retained character strings to thus perform a secure access checking function for enabling or rejecting user access to a desired service;

In accordance with another aspect of the present disclosure there is provided a method of personally configuring a device for use by a user, said device comprising:

a card portion having a surface; and electronic apparatus attached to said card portion, said electronic apparatus comprising a memory, processor means coupled to said memory means, and communication means for coupling said processor means to a configuring system arranged for configuring said device;

said method comprising the steps of:

(a) obtaining secure data from said user, said obtaining comprising the sub-steps of:

(aa) prompting said user to devise a question, an answer to which is known by said user;

(ab) receiving data comprising a character string from said user corresponding to said known answer; and (ac) associating an icon with said character string;

(b) configuring said device as a secure access device, said configuring comprising the sub-steps of:

(ba) storing in said memory said character string;

(bb) forming said associated icon onto said surface; and (bc) storing in said memory a positional relationship of said icon on said surface associated with said character string; and (c) forming an interface for manipulation by said user, said forming comprising the sub-steps of:

(ca) providing a (first) set of icons onto said surface; and (cb) storing in said memory a positional relationship between each said icon of said first set and a corresponding character retained by said memory.

In accordance with another aspect of the present disclosure there is provided a method of using a secure access device to obtain access to a secure service, said secure access device comprising:

a card portion having a surface onto which are formed a plurality of user interpretable icons; and electronic apparatus attached to said card portion, said apparatus comprising:

a memory in which is retained at least one character string associated with a corresponding one of said icons;

processor means coupled to said memory means; and communication means for coupling said processor means to a reading device configured to facilitate reading said secure access device and to provide access to said service;

wherein said processor means is configured to relate reading signals generated from a user selection of at least one of said icons and received via said communication means with at least one of said retained character strings to thus perform a secure access checking function for enabling or rejecting user access to a desired service;

said reading device comprising:

a communications processor for connecting said communication means to said service; and a data entry device providing for user selection of individual ones of said icons and forming said reading signals, said method comprising the steps of:

(a) obtaining data from said user, said obtaining comprising the sub-steps of:

(aa) detecting a selection by said user of a first one of said icons; and (ab) detecting subsequent sequential selection by said user of a plurality of said icons;

(b) checking said data, said checking comprising the sub-steps of:

(ba) associating said selection of said first icon with a stored said character string whereby failure to associate said selected first icon with a stored said character string aborts said checking function and inhibits access to said service by said user;

(bb) associating each said icon of said subsequent sequential selection with a corresponding character to form an interrogating character string; and (bc) comparing said interrogating character string with said selected stored character string wherein a valid comparison provides for access of said user to said service.

In accordance with another aspect of the present disclosure there is provided a multiple level user interface card for interfacing between a user provided with a card reader communicating with a computer and an application program having a multiplicity of hierarchical operating or ordering levels operating on, or operated by, said computer, said card comprising:

a smart card having a plurality of user activatable regions thereon and an electronic memory with data stored therein corresponding to each of said regions, wherein said regions and said data are arranged in a hierarchy with a multiplicity of levels corresponding to said application program levels, and each level has a plurality of regions, and wherein selecting a region of each said level in the sequence of said hierarchy activates said stored data in said hierarchical sequence to operate said application program at the operating or ordering level corresponding to the last selected region.

In accordance with another aspect of the present disclosure there is provided a method of interfacing at multiple levels between a user and an application program operating upon a computer, said application program having a multiplicity of hierarchical operating or ordering levels, said method comprising the steps of:

(a) providing said user with a smart card or interface card (known per se) having a plurality of user activated regions thereof and an electronic memory with data stored therein corresponding to each of said regions;

(b) arranging said regions and said data in a hierarchy with a multiplicity of levels corresponding to said application program levels, each of said levels having a plurality of regions;

(c) providing said user with a smart card reader communicating with said computer, (d) inserting said card into said smart card reader, and (e) selecting a region of each said level in the sequence of said hierarchy to activate said stored data in said hierarchical sequence to operate said application program at the operating or ordering level corresponding to the last selected region.

In accordance with another aspect of the present disclosure there is provided a secure access device for interfacing between a user thereof and application program having a plurality of hierarchical operating levels and being operable by a computer, said secure access device comprising:

a card portion having a surface on which are formed a plurality of user interpretable icons, there being at least one security icon associated with a security function for enabling access to at least one of said hierarchical operating levels, and at least one functional icon associated with each said hierarchical operating level, said functional icons being arranged into regions on said surface and associated with a corresponding one of said operating levels; and electronic apparatus associated with said card portion, said apparatus comprising:

a memory comprising a mapping between each said icon and stored data associated therewith, at least each said security icon each having a corresponding stored character string;

processor means coupled to said memory means; and communication means for coupling said processor means to said computer and a reading device, said reading device being configured to enable user selection of a function associated with a corresponding one of said icons;

wherein said processor means is configured to relate reading signals generated from a user selection of at least one of said security icons and received via said communication means with at least one of said retained character strings to thus perform a secure access checking function for enabling or rejecting user access to at least one of said hierarchical operating levels;

whereupon user selection of a said icon in a said region in a sequence of said hierarchy activates said stored data in said hierarchical sequence to operate said application program at the operating level corresponding to the last selected region.

Other aspects are also disclosed.

BRIEF DESCRIPTION OF THE DRAWINGS

A number of embodiments of the present invention will now be described by way of example only, with reference to the drawings, in which:

FIG. 1 is a plan view of a smartcard configured for use as a secure access card;

FIG. 2 is a vertical cross-section along the line II—II of FIG. 1;

FIG. 3 is a perspective view of a secure access card customising system;

FIGS. 5A and 5B are front elevation and vertical sections respectively of a secure access card and associated reader;

DETAILED DESCRIPTION INCLUDING BEST MODE

Figure 4:
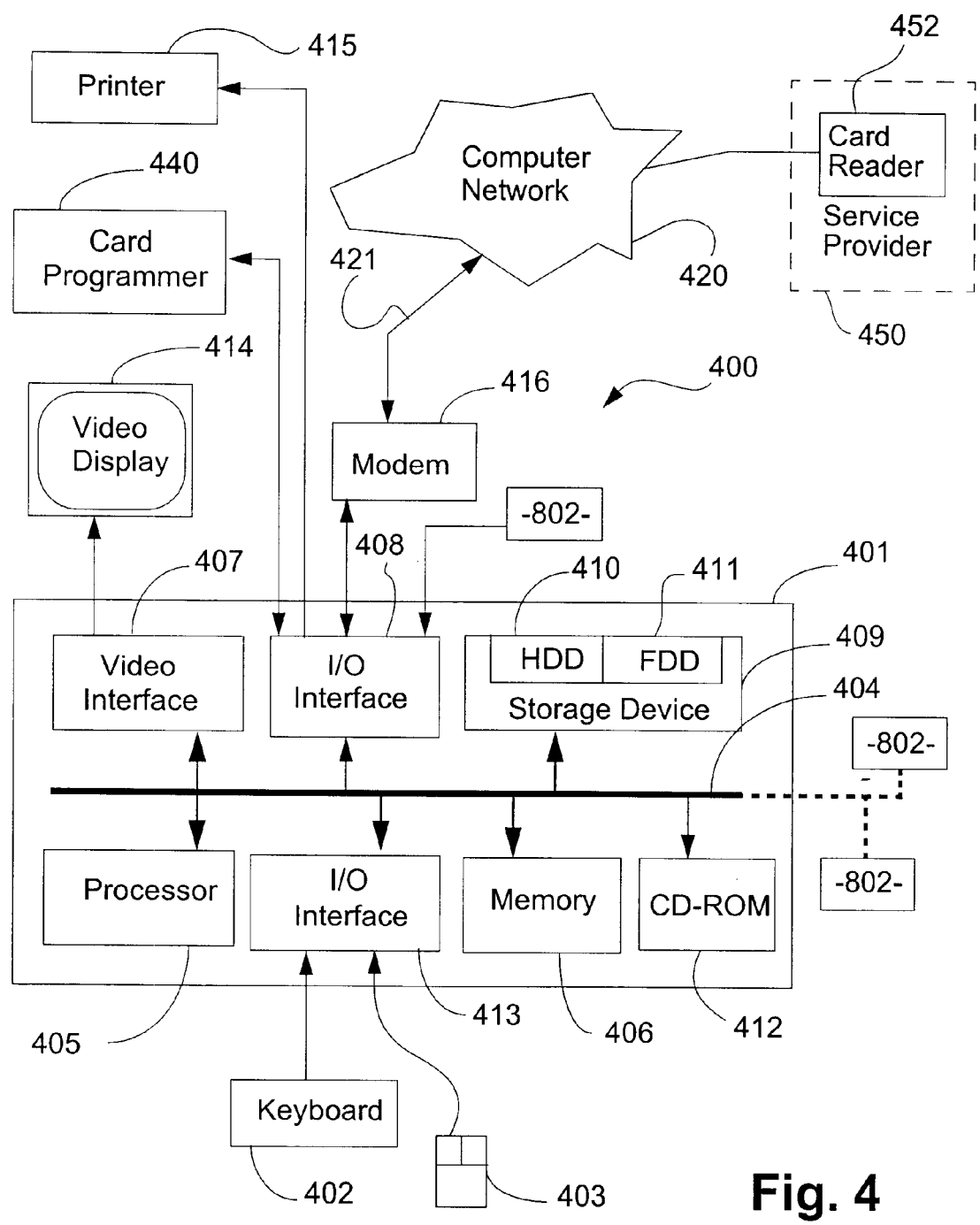
FIG. 4 is a schematic block diagram representation of the system of FIG. 3.

FIGS. 1 and 2 show a secure access card 100 which includes a substantially planar card portion 102 onto which a user interface surface 112 is formed. The secure access card 100 also includes a portion 104 formed in the card portion 102 and which encloses and/or envelopes an electronic embedded computer chip 106 capable of performing cryptographic computations, communications and memory functions. The computer chip 106 is electrically coupled 108 to a number of external contacts 110 that provide for communication of data between the access card 100 and a reader device or programmer device (to be described). The card 100 in this fashion may be formed by a computationally enhanced smartcard device, as distinct from a mere memory smartcard, each known in the art, when the former is provided with the user interface surface 112. Electrical connections to the chip 106 are formed by communication connections 110, seen in FIG. 2, arranged at an outer surface of then card 100. Preferably, the chip 106 is constructed so that once programmed by the user in the manner to be described, the contents cannot thereafter be casually read. This is a technique known to those skilled in manufacturing microcontroller devices, and makes use of a feature known as a security bit. When turned "on" after the programming step, the security bit causes the program stored within the chip 106 to be non-readable. Microcontrollers with this feature can be found in product catalogues of the manufacturer Motorola, amongst others.

The user interface surface 112 has provided thereon a number of graphical icons, a first group 114 of which depict an alphanumeric keypad in a fashion similar to keypads known in the art of telecommunications and like arrangements. A number of other icons are provided including a "start of input" icon 116, an end of input icon 118 and a number of user customisable icons 120–128. The icons 114–128, configured upon the surface 112, are each associated with an x-y co-ordinate mapping retained within the computer chip 106 and which provides for interpretation of a user selection of any one of the icons 114–128 (to be described).

Figure 6:
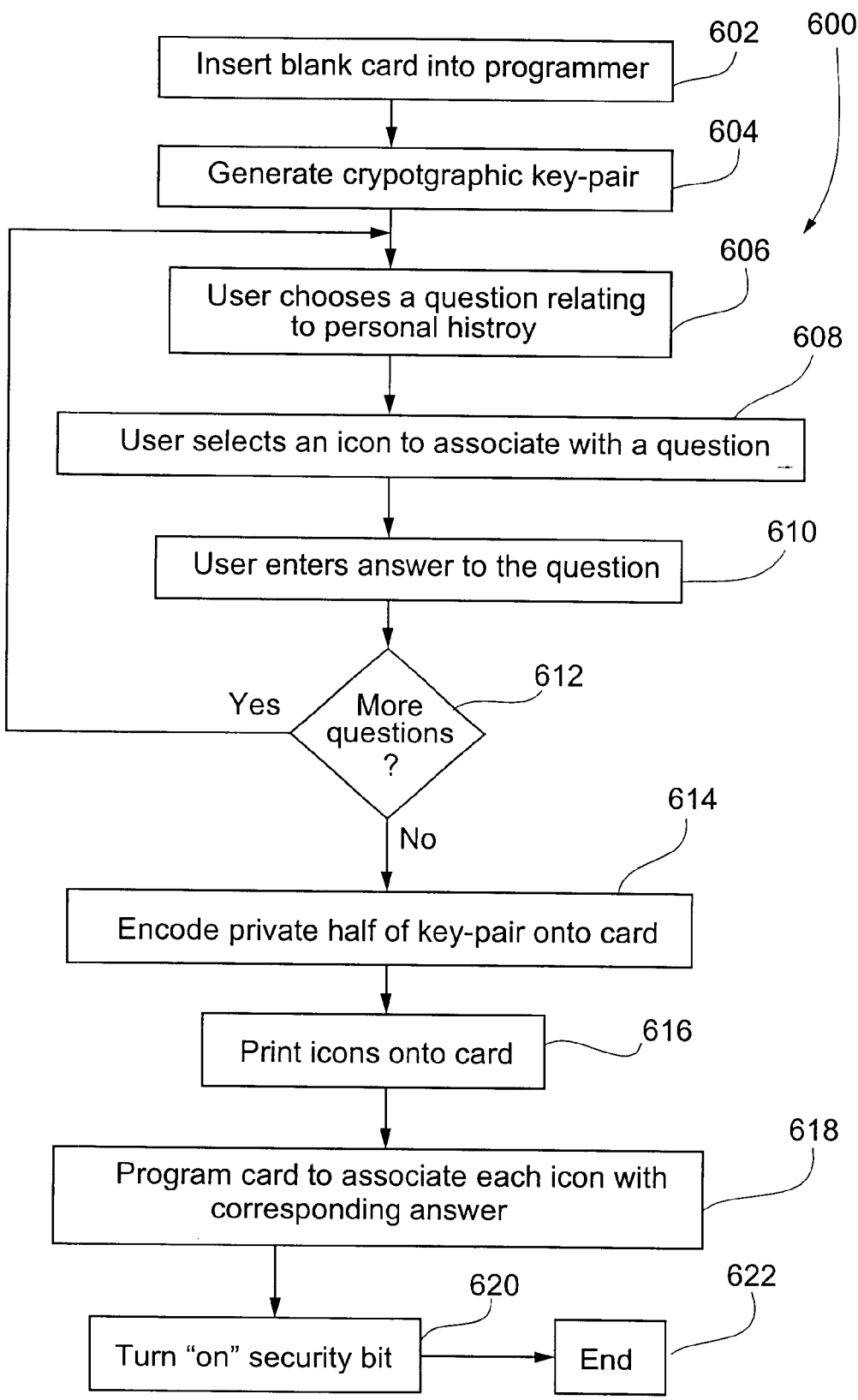
FIG. 6 is a flowchart of those operations involved in forming the secure access card.

The secure access card 100 is personally customised by the user through a programming sequence depicted in the method of FIG. 6. The method of FIG. 6 is preferably practiced using a general-purpose computer system 400, such as that shown in FIGS. 3 and 4 wherein the processes of FIG. 6 may be implemented as software, such as an application program executing within the computer system 400 as graphically displayed at 600 on the display 414 in FIG. 3. In particular, the steps of method of FIG. 6 are effected by instructions in software that are carried out by the computer system 400. The software may be divided into two separate parts; one part for carrying out the access card programming methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus in accordance with the embodiments of the invention.

As seen in FIG. 3, the computer system 400 comprises a computer module 401, input devices such as a keyboard 402 and mouse 403, and output devices including a secure access card programmer 440 and a display device 414. Further, and as seen in FIG. 4, a Modulator-Demodulator (Modem) transceiver device 416 may be used by the computer module 401 for communicating to and from a communications network 420, for example connectable via a telephone line 421 or other functional medium. The modem 416 can be used to obtain access to the Internet, and other network systems, such as a Local Area Network (LAN) or a Wide Area Network (WAN).

The computer module 401 typically includes at least one processor unit 405, a memory unit 406, for example formed from semiconductor random access memory (RAM) and read only memory (ROM), input/output (I/O) interfaces including a video interface 407, and an I/O interface 413 for the keyboard 402 and mouse 403 and optionally a joystick (not illustrated), and an interface 408 for the modem 416. A storage device 409 is provided and typically includes a hard disk drive 410 and a floppy disk drive 411. A magnetic tape drive (not illustrated) may also be used. A CD-ROM drive 412 is typically provided as a non-volatile source of data. The components 405 to 413 of the computer module 401, typically communicate via an interconnected bus 404 and in a manner which results in a conventional mode of operation of the computer system 400 known to those in the relevant art. Examples of computers on which the embodiments can be practised include IBM-PC's and compatibles, Sun Sparc-stations or alike computer systems evolved therefrom.

Typically, the application program mentioned above is resident on the hard disk drive 410 and read and controlled in its execution by the processor 405. Intermediate storage of the program and any data fetched from the network 420 may be accomplished using the semiconductor memory 406, possibly in concert with the hard disk drive 410. In some instances, the application program may be supplied to the user encoded on a CD-ROM or floppy disk and read via the corresponding drive 412 or 411, or alternatively may be read by the user from the network 420 via the modem device 416. Still further, the software can also be loaded into the computer system 400 from other computer readable medium including magnetic tape, a ROM or integrated circuit, a magneto-optical disk, a radio or infra-red transmission channel between the computer module 401 and another device, a computer readable card such as a PCMCIA card, and the Internet and Intranets including e-mail transmissions and information recorded on web-sites and the like. The foregoing is merely exemplary of relevant computer readable media. Other computer readable media may be practiced.

The programmer 440 is configured to provide for both electronic programming of the computer chip 106 and also for the printing of the various icons 114–128 on to the surface 112 of the security access card 100. Alternatively, the icons 114–128 may be printed separately and in a traditional fashion upon an adhesive label or sticker which can subsequently be applied to the programmed smart card thereby providing and forming the icons 114–128 on the surface of the smart card to complete formation of the card 100.

The method of programming the security access card can be described with reference to the flow chart of FIG. 6 where the method 600 is performed using the computer system 400 and associated programmer device 440 shown in FIG. 3. Initially, at step 602 the user inserts a blank card 100 (ie. a card 100 without any of the icons 114–128 printed on the surface 112) into the programmer 440. The user then at step 604 instructs the computer system 400 to generate a cryptographic key public/private key pair of sufficiently large number of bits in length.

At step 606, the user enters a question relating to the user's personal history for which an answer is known by the user. For example, the question may be "the registration number of the car that belonged to my first girlfriend". At step 608, the user selects an icon that will serve to remind the user of the particular question just posed. In the example above, the icon could be that of a motor car or perhaps a thumbnail image of the girlfriend, as desired.

At steps 610 which follows, the user enters into the computer system 400 the answer to the question posed in step 606 and the answer is then associated by the computer system 400 with a mapping scheme for the icons 114 seen in FIG. 1. For example, the registration number may be ABC123, which corresponds to the numbers 111123 of the alphanumeric icons 114.

At step 612, the program 600 asks if the user would like to include further questions for incorporation on to the card 100. If so, the program returns to step 606 and repeats steps 610 and 612 for each further question.

When all questions have been asked, associated with appropriate icons and answered, in step 614, the private half of the key pair is encoded into the card 100 using the chip 106. The public half of the key pair is disclosed to the user via the display screen 414 and made available to the world at large. Step 616 then instructs the programmer 440 to print the appropriate icons onto the surface 112 of the card 100. At step 618, the programmer 440 then programs the chip 106 with each of the answers and the corresponding mapping of the icon 120–128 to which each answer relates.

Strings formed by a concatenation of the questions and answers are then collated in a standard order, in alphabetical order. Such may be referred to as the user's Personal Entropy Key (PEK). The PEK is then used to encode the private half of the public/private key pair. In this way, the private key can be stored on the card 100 in the clear and need not require any special protection against extraction from the card 100, sine the private key is protected by the user's PEK.

As seen from FIG. 1, the card 100 includes provision for five icons 120–128 associated with appropriate questions and answers related to the specific user. Where for example, the user only assigns questions and answers to say, only three of those five icons, the remaining two icons may be formed as "decoy" icons which are unrelated to any question but, if selected by an unauthorised user, may be used to abort the validation process.

In an alternative to the question and answers seen in steps 606, 608 and 610, anagrams may be used to invoke an appropriate response from the user. For example, the selection of an icon of a "horse" could prompt the user to enter the answer "shore". Other scrambling schemes may be used without departing from the spirit or scope of the invention. In essence, all that is required is an arrangement whereby the icon printed upon the card 100 provides the user with a strong reminder as to required answer, but largely is incomprehensible to unauthorised users. Advantageously, the program 600 is accompanied by a tutorial that advises the users of satisfactory scrambling schemes.

The security access card 100 is used in response in request for a service from a provider and is read using a card reader 452, seen in FIGS. 5A and 5B, and typically associated with the service provider 450. As seen from FIGS. 5A and 5B, the secure access card 100 is inserted into the reader 452 such that a transparent touch sensitive panel 456 overlies the printed icons on the surface 112. An electrical connection is made at 458 to the chip 106 whereby an electronics module 460 of the reader 452 can relate a touching of the panel 456 with the underlying icon 114–128 through interpretation of the data transferred via the chip 106. A signal 462 output from the reader 452 may be used to provide for implementation of the service.

Figure 7:
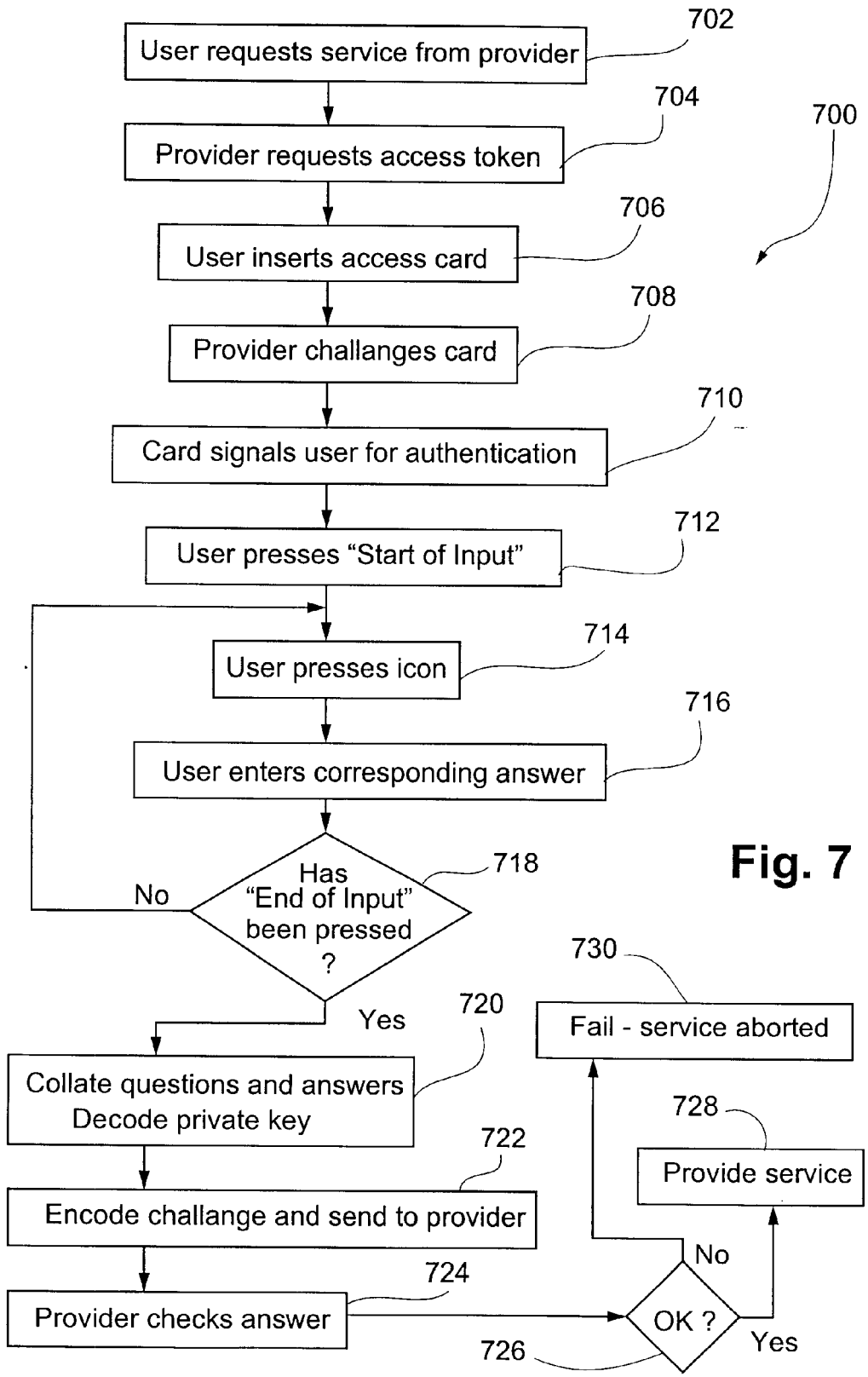
FIG. 7 is a flowchart of operations required to use the secure access card.

The actual reading of the card is depicted in relation to the method 700 shown in FIG. 7. The method 700 commences with step 702 where the user requests a service from a provider. At step 704, the provider requests an access token to be supplied by the user. In order to comply, at step 706, the user inserts an access card 100 into the reader 452. Upon detection of the insertion of the card, the provider issues a digital challenge to the card 100 requesting a datum known to the provider to be encoded with the user's private key. At step 710, the card 100 signals to the user the need to provide for authentication. This signalling may be accomplished using an audible tone or the illumination of a light or other signal emanating from the reader 452. In order to provide the appropriate authentication, the user at step 712 "presses" the start of input icon 116. In this regard, it will be appreciated that the user does not press the icon 116 per se, but presses the touch panel 456 overlying the icon 116 resulting in an actuation of a function associated with the icon 116. The x-y co-ordinates of the pressed portion of the touch panel 456 are then interpreted by the module 460 as coinciding with the location of the start of input icon 116. Such an action prepares the computer chip 106 for an authentication mode.

At step 714, the user then "presses" or actuates one of the icons 120–128 thus corresponding to an appropriate question, and then using the icons 114 enters the corresponding answer at step 718. Steps 714 and 716 are repeated for, preferably, each of the icons 120–128 that have been entered by the user. Once the user has answered the appropriate number of questions, step 718 detects whether or not the end of input icon 118 has been actuated. If so, the computer chip 106 within the card 100 collates the questions with answers at step 720 to determine if the private key need be decoded. For example, if the user actuates the car icon corresponding to his girlfriend's car, the icon, the icons ABC 123 (corresponding to the numbers 111123) are then entered indicating an appropriate answer. A string formed by the concatenation of the questions and answers is then collated in the standard order (alphabetical order as the PEK). The PEK is then used to decode the private half of the public/private key pair. At step 722, the chip 106 encodes the challenge sent by the provider using the users private key and returns the result to the service provider via the connection 462. At step 724, the provider checks the answer, making use of the user's public key. If the answer is incorrect as determined at step 726, the authentication is aborted at step 730. If not, at step 728, the service requested by the user is provided.

The security access card 100 may be prepared in a fashion so that it is generic to a number of uses to which it is to be put to by the user. Alternatively, any one user may hold a number of such cards dedicated for specific use (eg. Internet shopping, e-mail communications, amongst many other uses). Further, a number of the customisable icons (eg. 120, 122) may be configured to provide the personal-security aspect described above, whilst the other icons (eg. 124, 126, 128) may be formed in a "plain" manner that is directly descriptive of a function desired to be performed or service to be accessed.

The above described arrangements are applicable to industries and operations that require security authentication. This may include physical access control to buildings, authorising financial transaction, personal identification and other uses.

Figure 8:
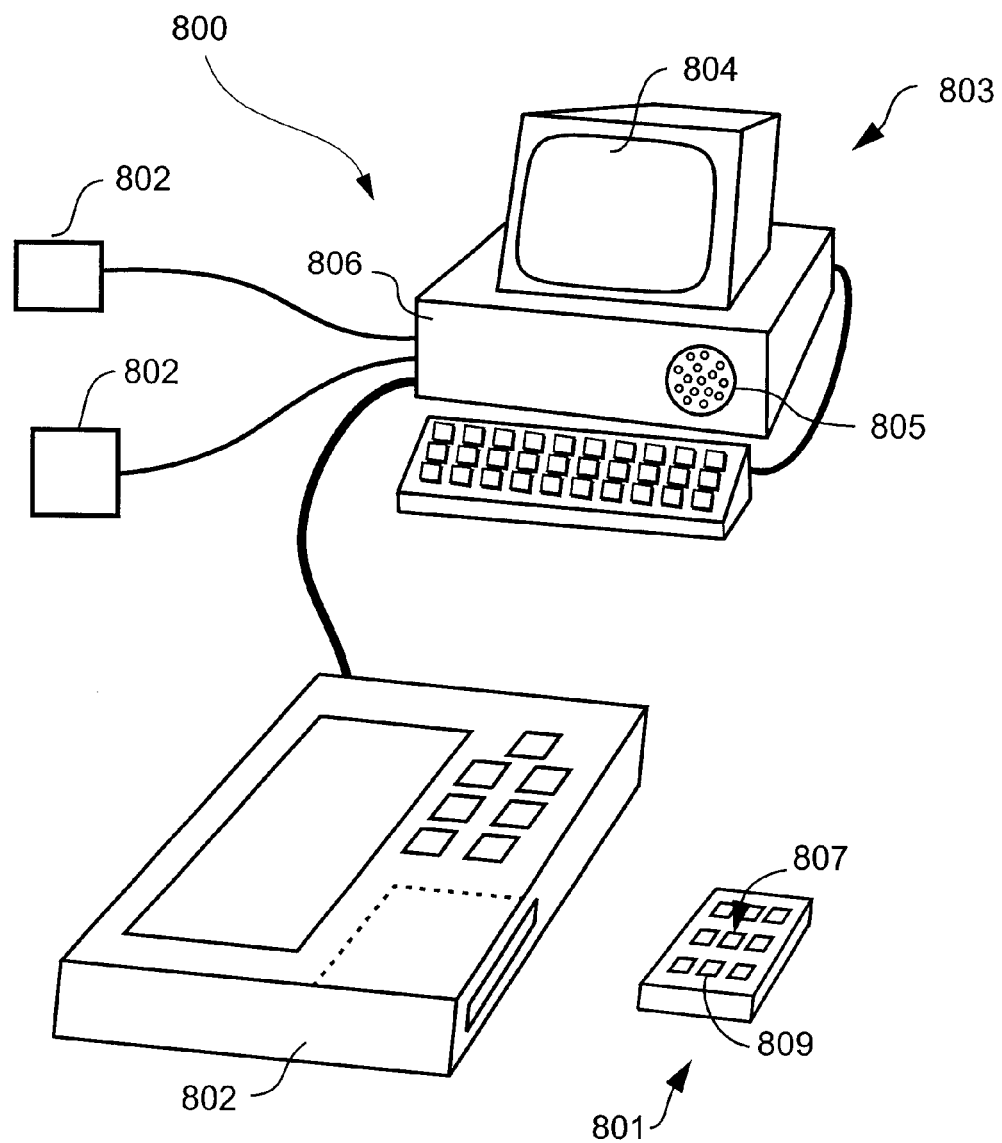
FIG. 8 is a schematic perspective view of a hierarchical information retrieval system.

FIG. 8 shows a hierarchical information retrieving system 800 for enabling a user to easily access to data or operations. The system 800 includes a smartcard/memory card 801 as a customized user interface, one or more card readers 802 for interpreting user actions, through interfacing with an icon or button map 807 arranged on the card 801, and for transmitting an appropriate signal via a connection to a computer work station 803. The work station 803 includes a display device 804, a sound output or loudspeaker 805 for responding to user actions, and a computer server module 806 for information management and processing. The smartcard 801 may, in its simplest form, comprise a standard memory function, as opposed to the card 100 which requires an additional processing capability.

In information retrieval directions are displayed on the front face of the customized memory card 801 to guide a user to the desired data or function. The directions may also be supplemented by further instructions displayed on the display device 804. The card 801 stores an image map which associates each multi-level entry of the hierarchy with a particular region on the card 801 to provide quick access to information. Data related to the region is sent when the user actuates a particular region of the card 801. To group the regions on the card 801, the surface of a memory card 801 is divided into multiple portions referred to as sub-areas. The sub-area can be organized based on either level matter or application matter. Where the card 801 incorporates an array of physical buttons, such actuation may be achieved by depressing one or more of the buttons when the card 807 is inserted in the reader. Typically each button forms or is associated with a unique icon or indicia. Where the card 801 incorporates an array of icons, such activation may be achieved by depressing a transparent touch panel, forming part of the reader 802 and configured to overlay the card 801 when the latter is inserted into the former. For convenience of description, such actions may be considered functional alternatives and such terminology is used herein interchangeably unless otherwise explicitly noted.

For example, the lowest level of the card 801 is preferably configured as a standard interface which provides PREV (ious), NEXT and SELECT features. In such cases, the software application being executed by the work station 803 displays a list of items, one of which is highlighted, such that the individual icons or buttons 809 on the card 801 allow the user to step through the list. Pressing PREV or NEXT results in moving the highlighted item up or down through the items on the list, while pressing Select button selects the currently highlighted item on the list and activates the associated process.

The server 806 stores a plurality of information items that are preferably organized in multiple levels. When the user presses a particular icon on the card 801, the card reader 802 sends data stored in the card 801 corresponding to the pressed icon to the server 806. The server 6 receives selected hierarchy information items from the reader 802, responds to the user input by generating and presenting a brief display or sound information relating to the input and feedback on a current state of the apparatus, and initiates operations if needed in connection with the received hierarchy information.

Figure 9:
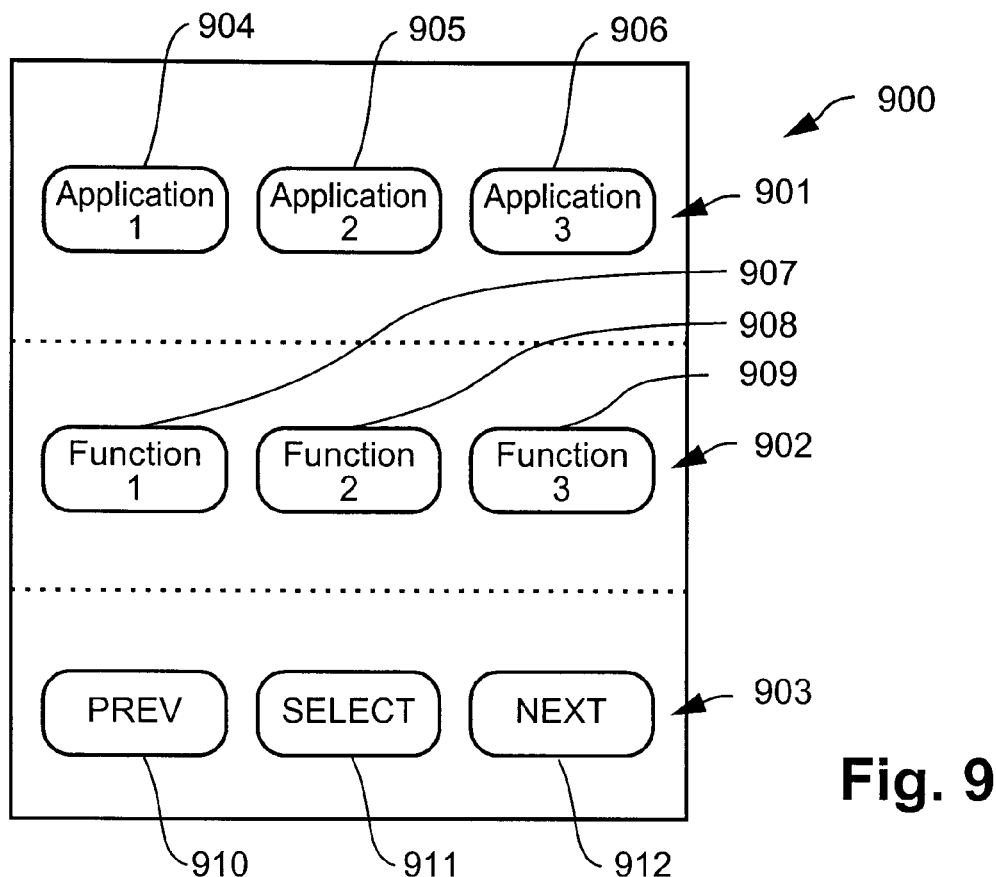
FIG. 9 shows an arrangement of multiple level index entries formed on a card useful with the system of FIG. 8.

FIG. 9 shows an arrangement of multiple level applications on a card 900. The first level 901 is a group of icons 904–906 for accessing the various (corresponding) applications associated with the card 900. A second level 902 is formed by a group of icons 907–909 of various functions common to each of the applications on the first level 901, while the implementation of the functions for each specific application are able to be different. A third level 903 is preferably a standard level that comprises the previously described PREV, NEXT, and SELECT icons or buttons 910, 911 and 912, respectively. To use the card 900, the user presses one of the icons 904–906 on the first level 901 to select a desired one of the applications. The correct indication for the selected application is presented to the user via either the display 904 or loudspeaker 905. The user then presses an icon 909 on the second level 902 to select a desired function. The correct indication for the selected function is then presented, along with a list of options corresponding to that function, all of which are shown on the display 904. The user may then scroll down or up the displayed list by pressing the PREV or NEXT icons 910, 912, and selects a desired option by pressing the SELECT icon 911. The action associated with the selected application, function, and option is then performed by the server 806.

Figure 10:
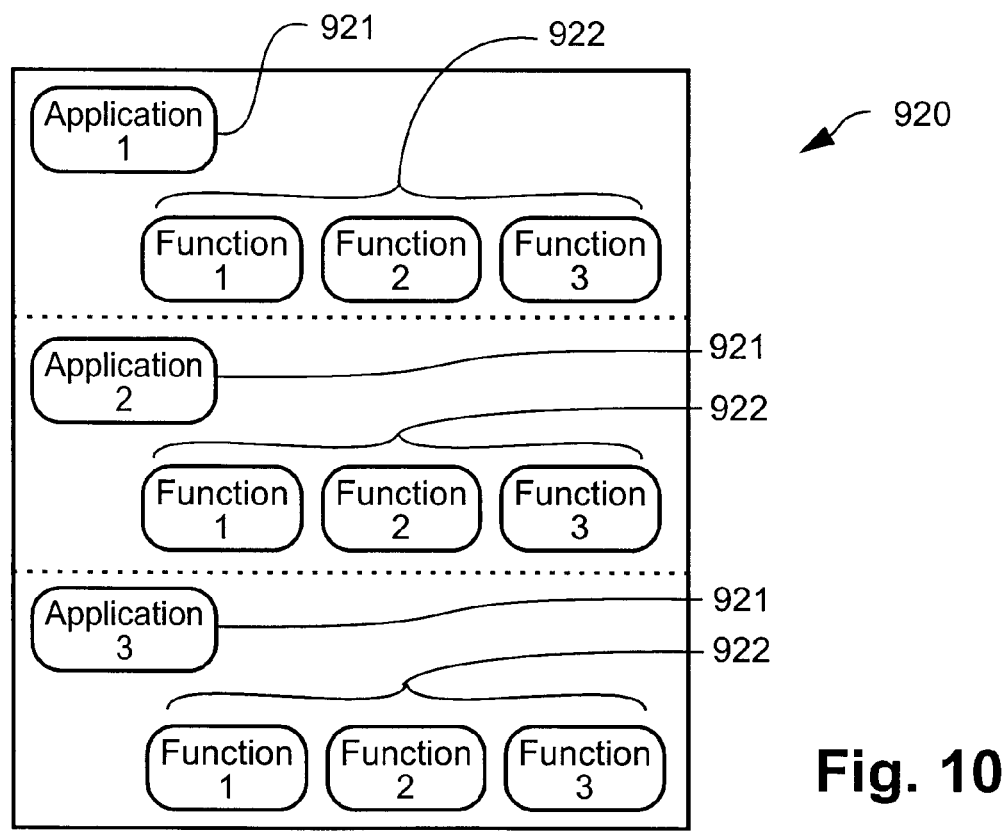
FIG. 10 shows another arrangement of multiple level index entries on a card.

FIG. 10 is an illustrative view showing another arrangement of multiple levels index entries on a card 920. In this arrangement, applications remain on a first level 921 and functions on a second level 922. Each of the three applications and their corresponding specific functions are grouped together in one sub-area because functions for each applications vary.

Figure 11:
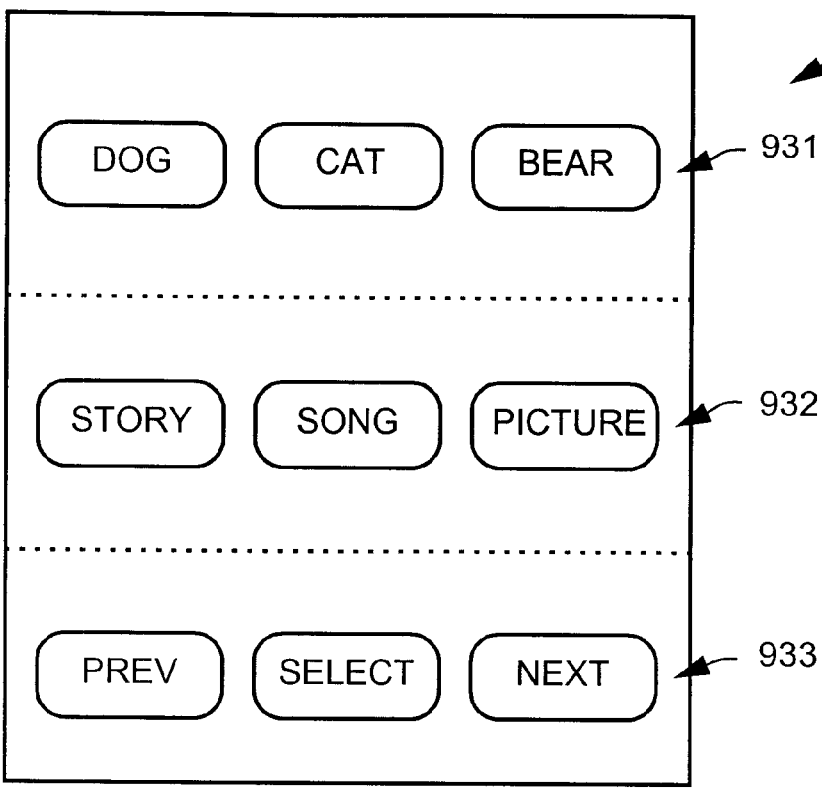
FIG. 11 shows another card of a children's gaming application.

Several examples are now provided to explain the use of a multiple level customisable portable user interface for retrieving information. In FIG. 11, an animal game application card 930 shows animals, for example, DOG, CAT, and BEAR icons on a first level 931. The types of media available for those animals are, in turn, organized on a second level 932 as STORY, SONG and PICTURE icons. Continuing with the example, STORY further provides a list of stories to be selected from by pressing the control icons or buttons on a third level 933. The information provided or accessed by each button is dependent on the button pressed in each previous level. For example, the user is able to press one of the animal icons on the first level 931, and then the SONG icon on the second level 932. A list of songs about the one animal will then be presented on the screen 804, and this list can be navigated using the "PREV" and "NEXT" icons on the third level 933. Finally, the specific song that is to be played on the loudspeaker 805 is selected by pressing the "SELECT" icon on the third level 933. Thus, the specific information that is displayed to the user is dependent on the animal selected from the first level, the type of media selected on the second level, and the specific piece of media selected by the third level.

Figure 12:
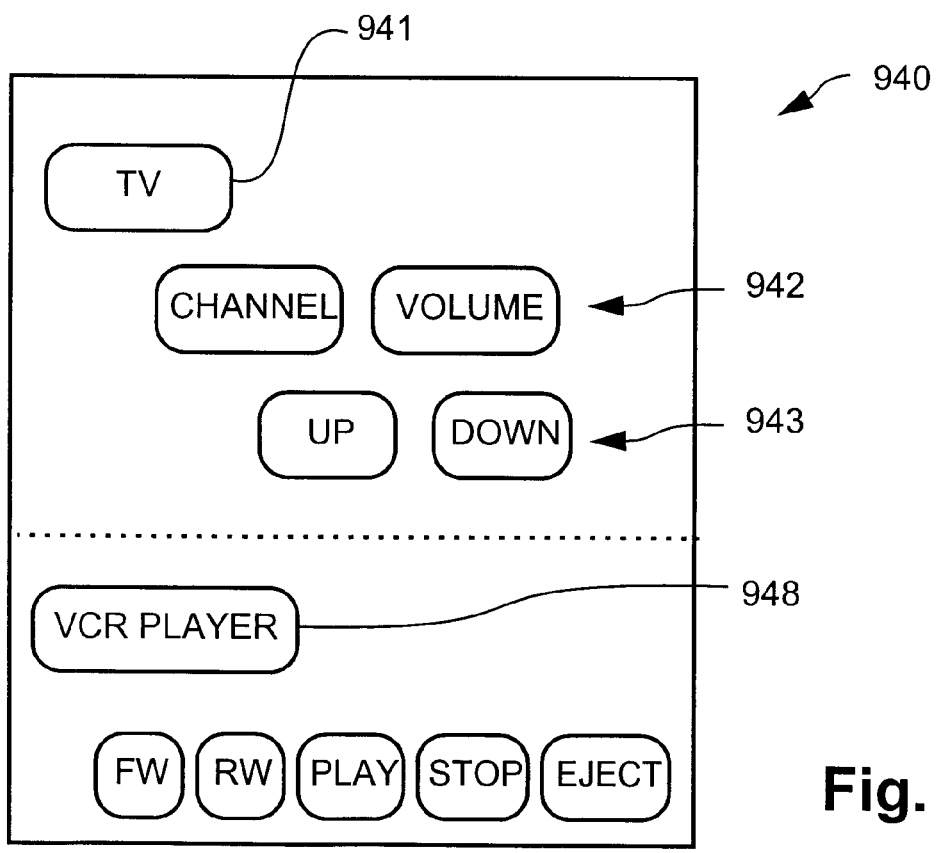
FIG. 12 shows another card of a home device control application.

Similarly, to control a home electronic device such as a TV or VCR using customized card 940 shown in FIG. 12, a user is able to press a TV icon 941 or a VCR icon 942 to turn on/off the corresponding device. Further pressing on the icon buttons on the second level 942 will cause the associated device to perform device specific functions such as changing channel or volume. Third level functions 943 are further provided for TV control of the functions shown on the second level of the television interaction panel. That is the channel or volume is moved up or down as desired. It will be appreciated in this connection that the VCR is a more straightforward device and thus only two layers of control are required.

Figure 13:
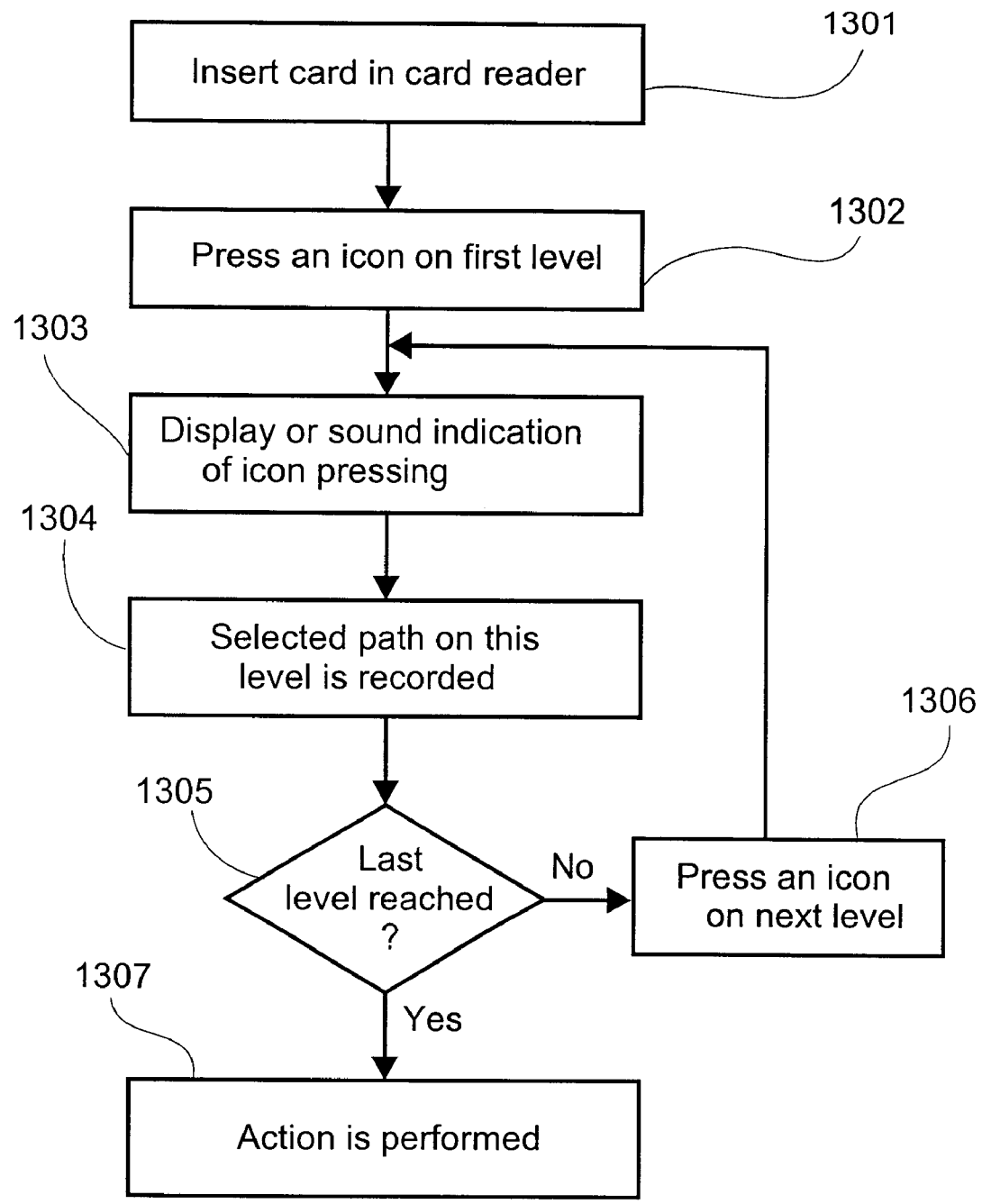
FIG. 13 is a flowchart showing a sequence of operations for stepping through multiple levels.

FIG. 13 is a flow chart which shows a sequence of operations for stepping through multiple levels. In step 1301, the user inserts a card into a card reader, and thus activates the application associated with the card. The user in step 1302 then presses one of the icons or buttons on the first level to narrow the search path. This results in the display of step 1303. The user goes further down the searching path in step 1304 by selecting buttons or icons on lower levels. Step 1305 checks whether the lowest level (a leaf node of the hierarchy) has been reached. If not, step 1306 enables the pressing of an icon/button on the next lower level. When the last (lowest) level is reached, step 1307 enables the information associated with the node to be retrieved or the desired process to be performed.

Figure 14:
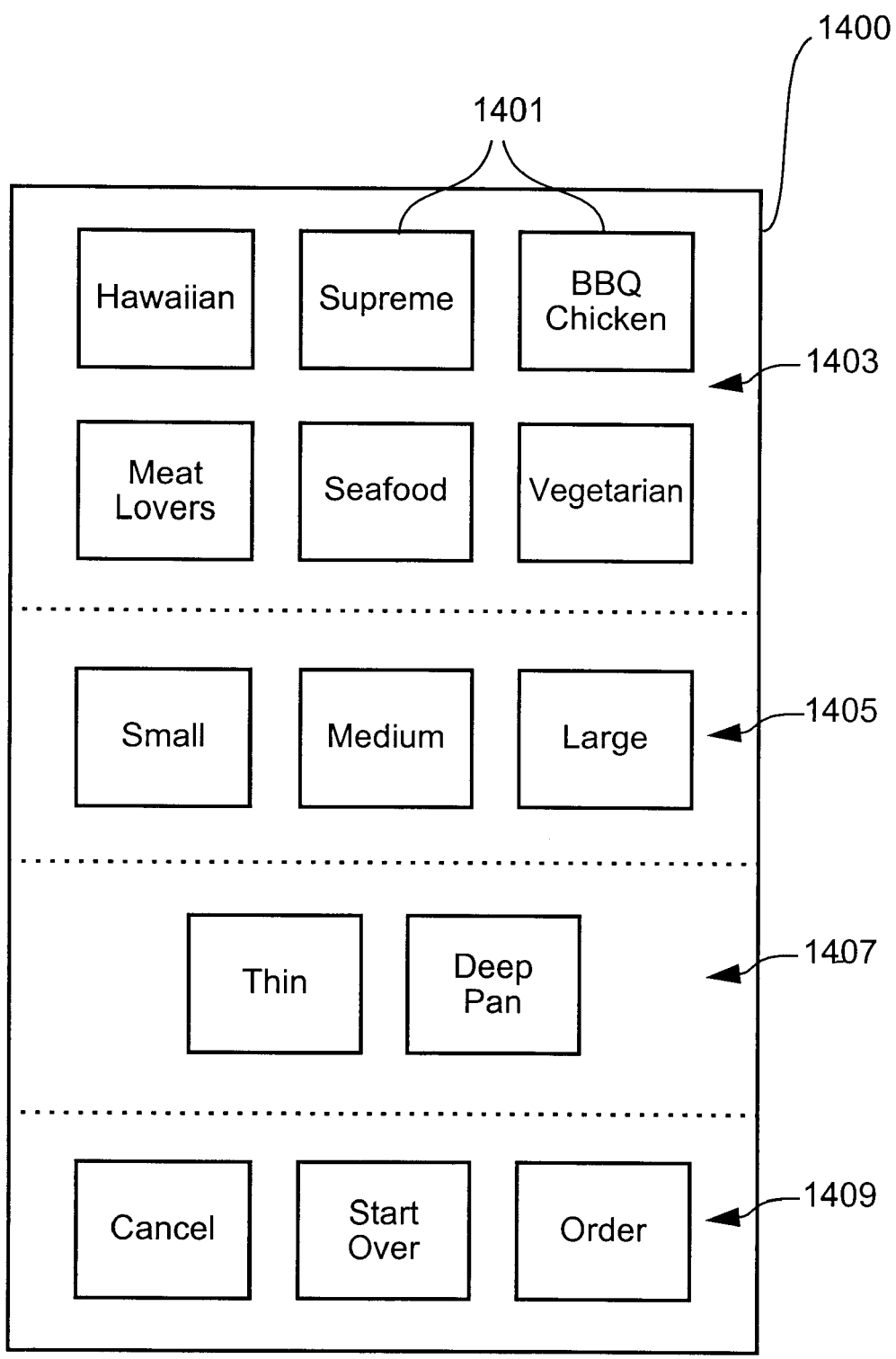
FIG. 14 shows another card in the form of a pizza ordering card.

FIG. 14 shows a further example of a pizza ordering card 1400 having icons 1401. The first three areas 1403, 1405 and 1407 on the card 1400 relate to the different attributes associated with a pizza. In the first area 1403 a plurality of icons, each corresponding to possible pizza toppings, are shown. Pressing on one of the icons in the area 1403 causes the selected pizza topping to be associated with the present order. The next area 1405 allows the user to select the size of the pizza for which the topping was selected from the first area. The third area 1407 allows a user to further select the type of base of the pizza described by the button presses in the previous areas 1403 and 1405. A fourth area 1409 provides several icons or buttons for controlling the ordering of the pizza. The "order" button provides a facility for placing the order with the pizza shop, from which the specified items are to be ordered. In addition, other buttons, namely "START OVER" and "CANCEL" are provided to give the ability to cancel the ordering of pizza, or to clear the current order of items and restart the order.

The ordering process can be either "in-house" or "remote". For remote ordering the server 806 connects via the telephone network or Internet to the pizza vendor. The pizza is then delivered to the user's location. For the "in-house" application, each table in the restaurant may be provided with one of the card readers 802. All the card readers 802 are connected to the same work station 803 (as indicated in FIG. 8) which coordinates all orders.

Figure 15:
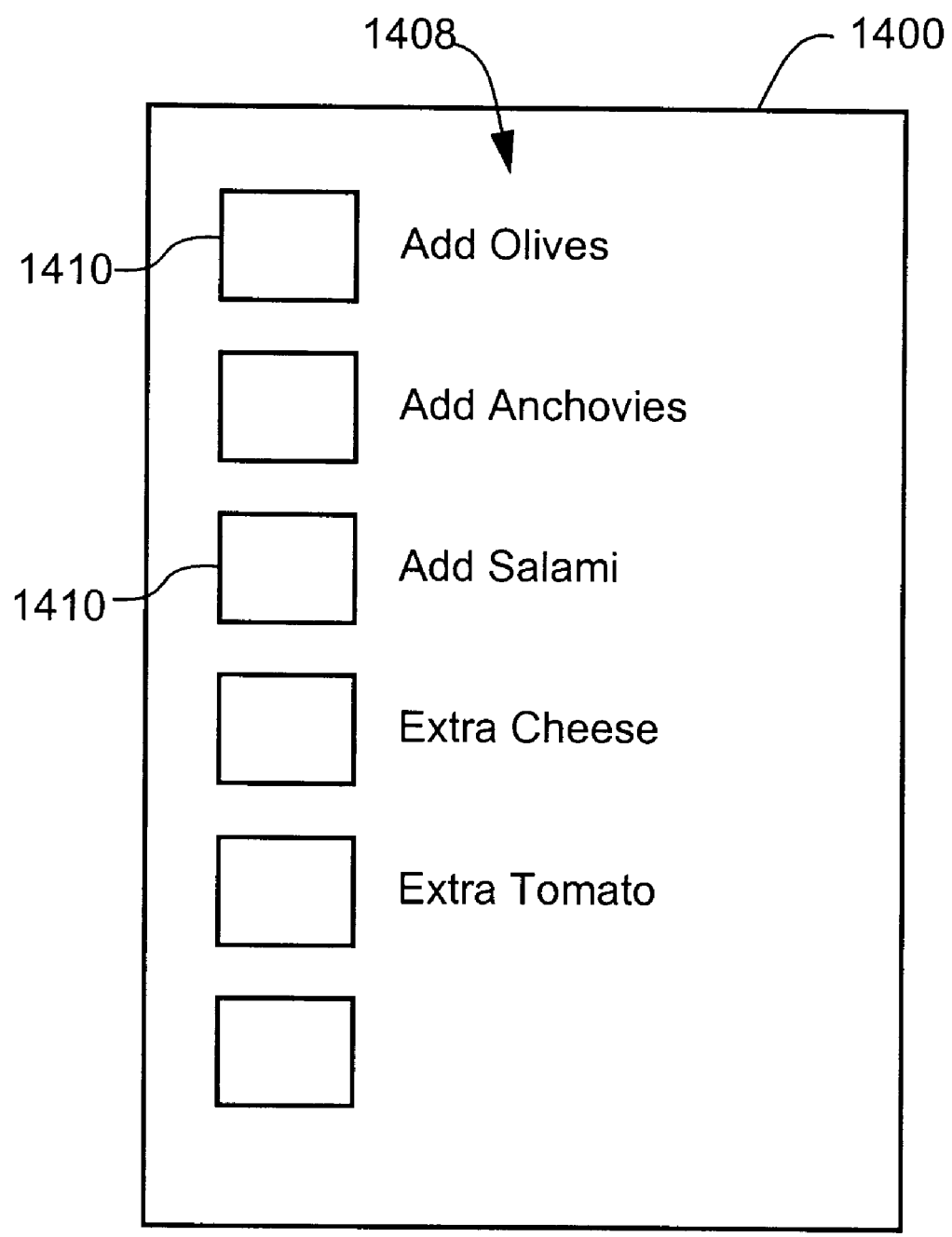
FIG. 15 shows an alternative pizza ordering card.

In a further extension of this arrangement, an additional area logically interposed between the third area 1407 and the fourth area 1409 can be provided. This is illustrated in FIG. 15 where the reverse face of the card 1400 is illustrated. The additional area 1408 is provided with a plurality of icons or buttons 1410 that enable extra or additional ingredients such as olives, anchovies, salami, extra cheese, etc to be included in the order.

Since there is insufficient space (or "real estate") on the front face of the card 1400, the rear face may be used. This necessitates the user removing the card 1400 from the card reader 802 prior to completing the order, turning the card 1400 over, and reinserting the card 1400 into the card reader 802. Thus, depending upon the modus operandi of the card reader 802, the card 1400 is required to have two sets of electrical contacts, or two magnetic tracks, etc, one located on each face of the card.

A particular advantage of the remote ordering service is that the user is able to provide his address, have his credit worthiness checked, and so on in a pre-sale registration process with the pizza vendor. This provides the pizza vendor with several advantages in addition to customer loyalty. One is that the vendor can be certain that the pizza order is not a hoax or trick call. Thus the usual return telephone call to verify a verbal pizza order is no longer required. Another advantage is that the address is correctly recorded and mis-hearing house numbers and/or street names during the conventional telephone ordering process cannot occur.

Figure 16:
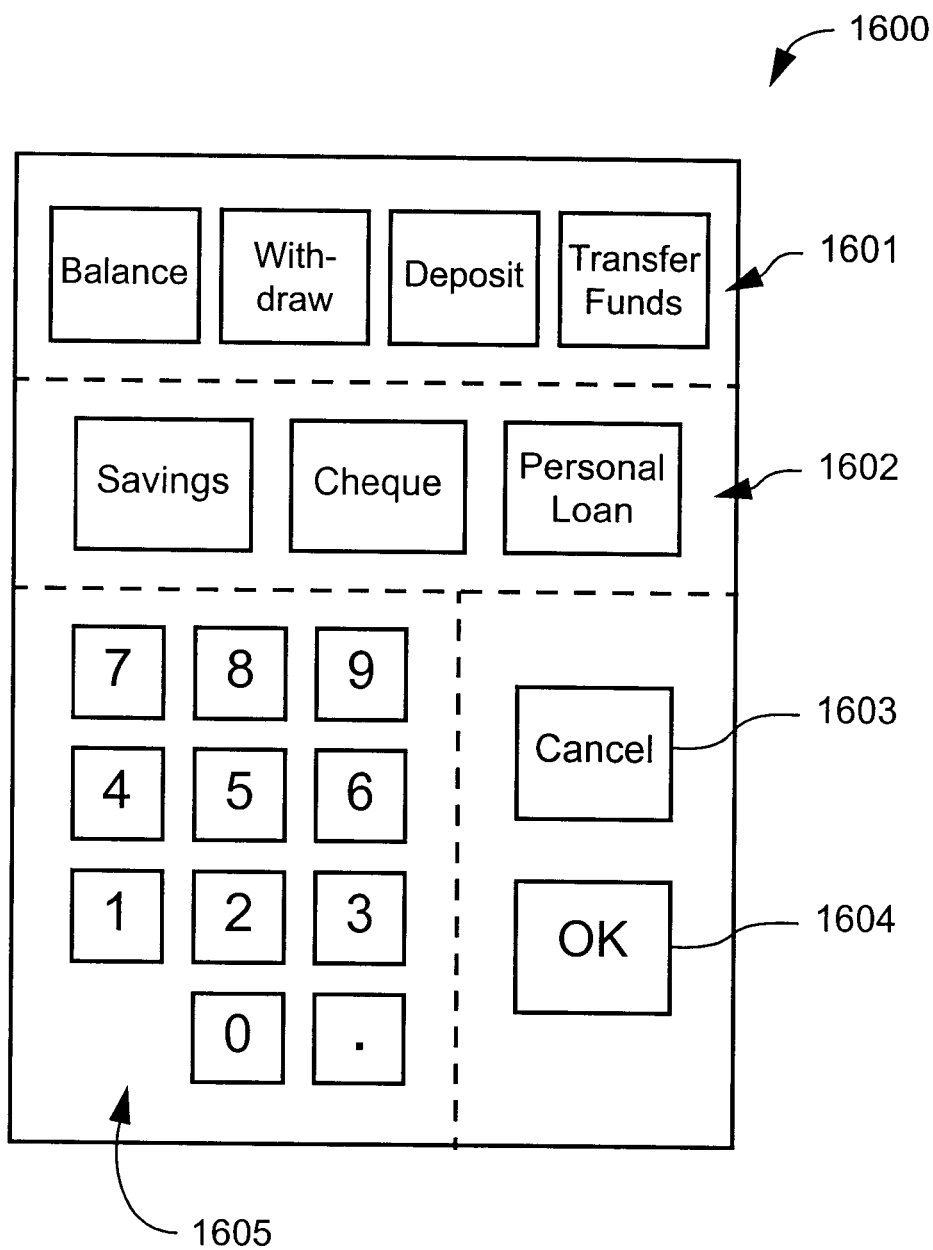
FIG. 16 shows another card of a bank transaction card embodiment in the form of a T-shirt printing application.

A financial transaction application interface card 1600 is shown in FIG. 16. The card 1600 provides a customer with a personalized interface enabling the customer to withdraw or deposit funds (for example, to or from an electronic cash mechanism on a smart card), as well as to check the customer's balance and transfer funds between accounts. These transactions may be performed in the user's own home with the equipment of FIG. 8, or at a public terminal with an appropriate card reader 802. The first level 1601 of icons shows a number of transaction types each of which is able to be performed using the interface card 1600 which, in this example, include withdrawal, deposit, transfer of funds and checking the balance of an account. A user is able to select one of these transaction types from the first level 1601, and then specify the account(s) to be used in the transaction by pressing on the icons on the second level 1602 representing the accounts available. In addition, a numerical icon keypad 1605 is available to specify the amount of the transaction, for example, for deposits and transfers. Control icons representing "OK" 1603 and "CANCEL" 1604 transactions are also provided.

The financial transaction card 1600 is able to be personalized for each user, for example, a children's banking interface card is able to have a substantially different appearance from an adult's banking interface card. Another example of card customisation is the second region 1602, where the accounts belonging to the owner of that card are listed. The icons shown are able to be relabelled with names having more personal significance to the user. For example, the same accounts shown could be relabelled so that the "SAVINGS" account is called "HOLIDAY FUND", the "CHEQUE" account becomes "BUSINESS ACCOUNT", and the "PERSONAL LOAN" becomes "CAR LOAN".

Figure 18:
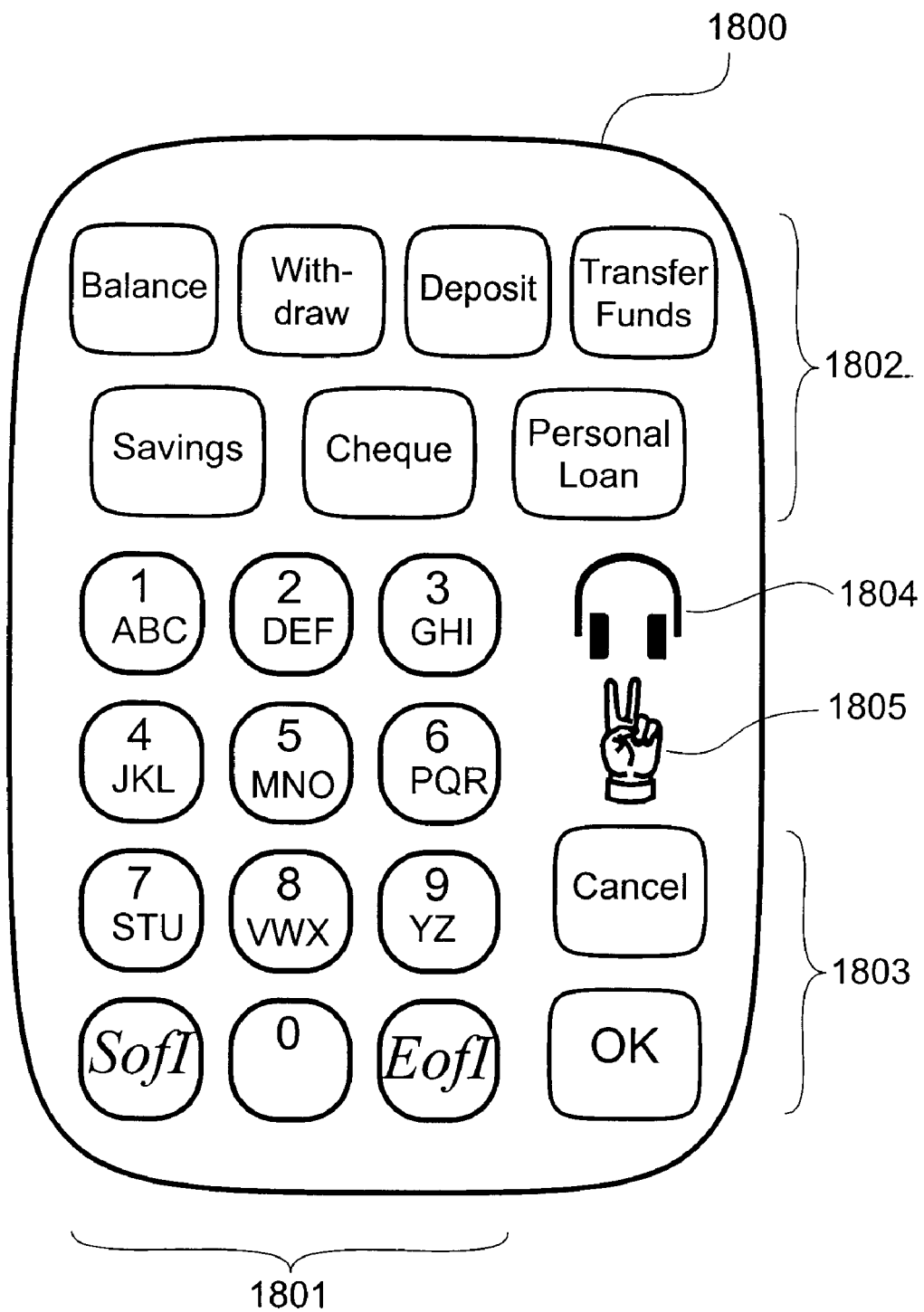
FIG. 18 is a view of a customised smartcard having security features and for use as a multiple level interface.

In a specifically advantageous arrangement, the security provisions of the arrangements of FIGS. 1 to 7 may be additionally incorporated into the card 1600, noting that the alphanumeric "keypad" 114 of FIG. 1 may substitute for the numeric "iconpad" 1605 of FIG. 16 and that the card 1600 must be formed using a device having both memory and processing capabilities as previously described. An example of such a card 1800 is shown in FIG. 18. In FIG. 18, the card 1800 includes alphnumeric icons 1801 corresponding in function to those seen in FIG. 1. Financial icons 1802 corresponding in function to those of FIG. 16 are also provided together with "CANCEL" and "OK" icons 1803. Security icons 1804 and 1805 are provided. To use the card 1800, once inserted into an appropriate reader 802 the user would depress the start of input icon (SofI) which would prompt a response from the service, display on the screen 804, requesting a password. The user would then depress the icon 1804 followed by the corresponding password. In this example, the icon 1804 represents a pair of audio headphones and may according to a user customization correspond to the password "LOUD", which may be entered via the icons 1801 followed by the end of input icon (EofI). The service may then request a further password, whereupon the user would select the icon 1805. In this example the icon 1805 could be erroneously interpreted to mean "V for victory" or "peace" or be correctly recognised as the salute used in the international Scouts organisation and requiring the password response "SCOUTS". Once both passwords are acknowledged, financial transactions as described with reference to FIG. 16 may then be performed.

In a further alternative implementation using the card 1800, validation of the security function associated with the icon 1804 may provide for enablement of one level of the financial transactions available (eg. obtaining an account balance or making a deposit) whereas in order to enable access to other functions (eg. withdrawal or transfer) validation of a second security function associated with the icon 1805 may be required. Such an arrangement of associating security levels with hierarchical operating levels and functions provides for tailoring a compromise between security requirements to user convenience.

Figure 17:
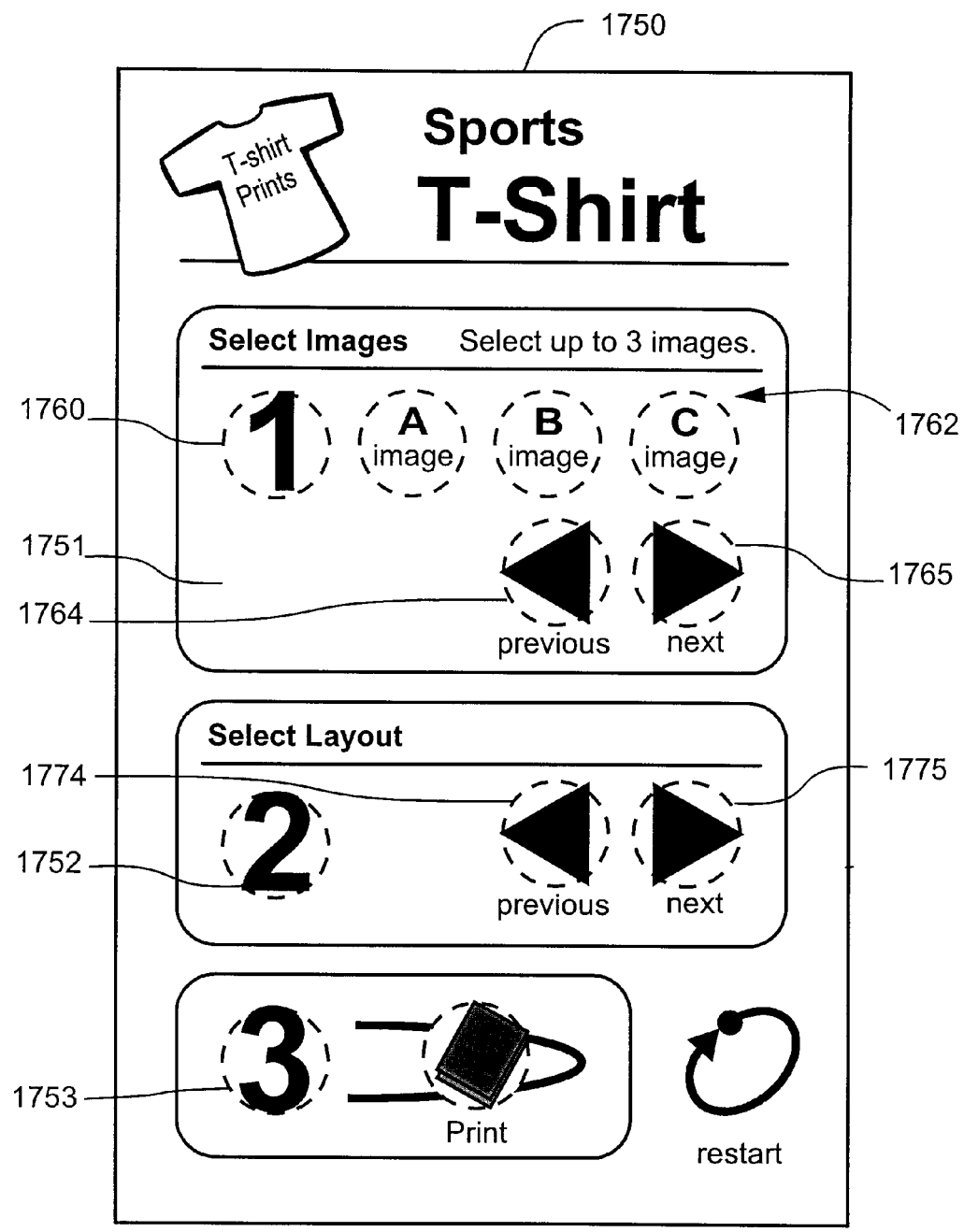
FIG. 17 shows another card useful for a T-shirt printing application.

In FIG. 17, a card 1750 for use in printing T-shirts is illustrated. The card 1750 has three levels or hierarchies of instruction as indicated by the numerals 1, 2 and 3 printed or otherwise formed on the front face of the card 1750. This is the order or sequence of operations followed by the user. The first hierarchy 1751 is initially selected (after the card 1750 has been inserted in the card reader 802) by pressing icon 1760. Then one of several images is selected by pressing one of the three icons 1762. This causes an instruction to be sent to the computer 803 which causes one of a stored library of images to be displayed on the screen 804.

Then, with the PREVIOUS icon 764 and NEXT icon 1765, the user is able to send instructions to the computer 803 which enables the images displayed on the screen 804 to be scrolled. This enables a particular image to be selected merely by the image remaining on the screen.

The user then can make a further choice. If the image A icon 1762 has been selected, this results in a T-shirt with a single image. If now the image B icon 1762 is selected this results in two images being displayed. Initially these will both be the same and by use of the PREVIOUS and NEXT icons 1764, 1765 the library of images can be scrolled until a suitable second image is selected by being allowed to remain on display. If it is desired to display three images on the T-shirt the image C icon 1762 is activated and the process is repeated. Alternatively, if only one image is thought better, image A icon 1762 is activated to restart the procedure.

Once a desired image or images has/have been selected, the second hierarchy icon 1752 is selected. This then sends an instruction to the computer 803 to move the program onto the next phase. As a consequence, one of many possible layouts of the selected image(s) is/are displayed. Possible layouts include a single large centrally located image, the same image reproduced three times at the corners of an imaginary equilateral triangle which is centrally located at the front of the T-shirt, a regular "polka dot" pattern all over the T-shirt where each "dot" is a small replica of the selected image, and so on. Such layouts can be scrolled using PREVIOUS and NEXT icons 1774 and 1775 respectively until the user has selected a desired layout.

Then the user moves the next (and final) hierarchy by pressing the icon 1753 which instructs the computer 803 to undertake a fabric printing process (known per se) by means of which a printer 415 of FIG. 4 prints the customised T-shirt. Alternatively, an iron-on transfer can be printed and used for subsequent transfer of the image to the T-shirt.

The customisable multiple level portable user interfaces described with reference to FIGS. 8 to 18 may be performed using the computer system 400 of FIG. 4 and appropriate application software running thereon. As seen in FIG. 4, the printer 415 couples to the I/O interface 408, as does a card reader 802. Alternatively, as required, one or more card readers 802 may couple to the bus 404 as illustrated. It will further be appreciated that, where the card 801 is formed using an "iconpad", as opposed to a "keypad", the readers 452 and 802 may be identical and accept either of the cards 100 or 801 as desired.

The foregoing describes only some embodiments of the present invention, and modifications and/or changes can be made thereto without departing from the scope and spirit of the invention, the embodiments being illustrative and not restrictive.

What is claimed is:

1. A secure access device comprising:
   a card portion having a surface onto which are formed a plurality of user interpretable icons comprising a set of visible reminder icons providing for user generation of corresponding system set-up data strings, and a set of answering icons providing for user generation of corresponding answer data strings said data strings being retained in a memory of the secure access device; and
   electronic apparatus attached to said card portion, said apparatus comprising:
     said memory in which are retained at least a plurality of said data strings; and
     communication means for coupling said memory to a reading device configured to facilitate reading of said secure access device;
   wherein said secure access device is placed in a performing state by a set of at least one of said system set-up data strings that is generated from a selection of a corresponding at least one of said set of said visible reminder icons and received via said communication means said performing state being adapted to process a set of at least one of said answer data strings generated by a subsequent corresponding selection of at least one of said answer icons, to thus perform a secure access checking function for enabling or rejecting user access to a desired service.

2. A secure access device according to claim 1 wherein said set of answering icons depict at least an alphanumeric character set.

3. A secure access device according to claim 2 wherein said set of answering icons further depicts at least one control function associated with forming said set of at least one of said answer data strings.

4. A secure access device according to claim 1 wherein said set of visible reminder icons each comprise an image.

5. A secure access device according to claim 1 wherein said answer data strings comprise position information of corresponding said answering icons on said surface, and said memory means and a processor means together perform a mapping function to associate said position information with said answer data string to thereby interpret a selection of a plurality of answering icons with said set of at least one of said answer data strings.

6. A secure access device according to claim 1 further comprising:
   cryptographic means for performing public-private key pair secure communications with a provider of said service in association with said checking function.

7. A secure access device according to claim 6 wherein said processor means and said memory comprise said cryptographic means.

8. A secure access device according to claim 1 wherein said electronic apparatus is formed within a tamper-resistant enclosure and said communication means comprises electrical connections formed on an exterior of said enclosure.

9. A method of personally configuring a device for use by a user, said device comprising:
   a card portion having a surface; and
   electronic apparatus attached to said card portion, said electronic apparatus comprising a memory, and communication means for coupling said memory to a configuring system arranged for configuring said device;
   said method comprising the steps of:
     (a) obtaining secure data from said user, said obtaining comprising the substeps of:
       (aa) prompting said user to devise a question, an answer to which is known by said user;
       (ab) receiving data comprising a system set-up data string from said user corresponding to said known answer; and (ac) associating a visible reminder icon with said system set-up data string;

(b) configuring said device as a secure access device, said configuring comprising the sub-steps of:
   (ba) storing in said memory said system set-up data string;
   (bb) forming said associated visible reminder icon onto said surface; and
   (bc) storing in said memory a positional relationship between said visible reminder icon on said surface and said system set-up data string; and (c) forming an interface for manipulation by said user, said forming comprising the sub-steps of:
   (ca) providing a set of answering icons onto said surface; and
   (cb) storing in said memory a positional relationship between each said answering icon and a corresponding answer data string retained by said memory; and (d) programming said electronic apparatus to compare, based on a user selection of said visible reminder icon, a set of at least one of said answer data strings generated from a selection of a corresponding at least one of said answering icons, with said stored system set-up data string to perform, in the device, a checking function associated with secure access to a service.

10. A method according to claim 9 wherein step (a) is repeated a plurality of times to define a set of system set-up data strings associated with corresponding said known answers, said set of system set-up data strings being associated with a corresponding set of visible reminder icons and step (b) is performed for each member of said set of said visible reminder icons.

11. A method according to claim 9 further comprising the step of:
(d) forming a protection feature, said forming comprising:
   (da) providing on said surface an arbitrary icon not associated with one of said data strings; and
   (db) storing in said memory a positional relationship of said arbitrary icon on said surface.

12. A method according to claim 9 wherein said set of answering icons comprise at least an alphanumeric character set.

13. A method according to claim 10 wherein said set of visible reminder icons each comprise an image.

14. A method according to claim 9 further comprising a step of programming said electronic apparatus to provide for public-private key pair secure communications with a provider of said service in association with said checking function.

15. A method of using a secure access device to obtain access to a secure service, said secure access device comprising:
   a card portion having a surface onto which are formed a plurality of user interpretable icons comprising a set of visible reminder icons providing for user generation of corresponding system set-up data strings, and a set of answering icons providing for user generation of corresponding answer data strings, said data strings being retained in a memory of the secure access device; and
   electronic apparatus attached to said card portion, said apparatus comprising:
      said memory in which is retained at least a plurality of said data strings; and
      communication means for coupling said memory to a reading device configured to facilitate reading of said secure access device and to provide access to said service;

wherein said secure access device is placed in a performing state by a set of at least one of said system set-up data strings that is generated from a selection of a corresponding at least one of said set of said visible reminder icons and received via said communication means said performing state being adapted to process a set of at least one of said answer data strings generated by a selection of a corresponding at least one of said answer icons, to thus perform, in the secure access device a secure access checking function for enabling or rejecting user access to a desired service;

said reading device comprising:

a communications processor for connecting said communication means to said service; and a data entry device providing for user selection of individual ones of said icons thereby forming said data strings, said method comprising the steps of:
   (a) obtaining data from said user, said obtaining comprising the sub-steps of:
      (aa) detecting a selection by said user of a first one of said visible reminder icons; and
      (ab) detecting subsequent sequential selection by said user of a plurality of said answering icons;
   (b) checking said data, said checking comprising the sub-steps of:
      (ba) associating said selection of said first visible reminder icon with a stored said system set-up data string;
      (bb) associating each said answering icon of said subsequent sequential selection with a corresponding answer data string to form a set of said answer data strings; and
      (bc) using said set of said answer data strings to perform a checking function to provide access of said user to said service.

16. A method according to claim 15 wherein said data entry device comprises a touch panel configured to overly said surface and through which said icons are visible to said user.

17. A method according to claim 15 wherein said subsequently selected answering icons together represent an alphanumeric character set and said first visible reminder icon comprises one of set of visible reminder icons each formed by an image.

18. A method according to claim 15 wherein step (a) is repeated plural times corresponding to plural said visible reminder icons, and step (b) is repeated for each said selected visible reminder icon.

19. A multiple level user interface card for interfacing between a user provided with a card reader communicating with a computer and an application program having a multiplicity of hierarchical operating or ordering levels operating on, or operated by, said computer, said card comprising:
   a smart card having a plurality of user activatable regions on at least one surface thereof, and an electronic memory with data stored therein corresponding to each of said regions, wherein said regions and said data are arranged in a hierarchy with a multiplicity of levels corresponding to said application program levels, and each level has a plurality of regions, and wherein selecting a region of each said level in the sequence of said hierarchy activates said stored data in said hierarchical sequence to operate said application program at the operating or ordering level corresponding to the last selected region.

20. The card as claimed in claim 19 wherein the regions of each hierarchical level are physically located on said card in physically separated groups such that all regions within each group belong to the same hierarchy.

21. The card as claimed in claim 19 wherein said regions are physically located on said card in physically separated groups such that each group has only one region of a first hierarchical level and at least one region of each of the remaining hierarchical levels.

22. The card as claimed in claim 19 wherein the regions of the lowermost hierarchical level have application operating levels including PREVIOUS, NEXT and SELECT.

23. The card as claimed in claim 22 wherein the number of hierarchical levels is three.

24. The card as claimed in claim 19 wherein the regions of the lowermost hierarchical level have application ordering levels are selected form the group consisting of CONFIRM or PLACE AN ORDER.

25. The card as claimed in claim 24 wherein the number of hierarchical levels is three.

26. The card as claimed in claim 24 wherein the number of hierarchical levels is four.

27. The card as claimed in claim 19 and having said regions located on one face thereof.

28. The card as claimed in claim 19 and having said regions located on both faces thereof.

29. A system for providing a multiple level user interface, said system comprising:
- an interface card as claimed in claim 19;
- a card reader;
- a computer communicating with said card reader; and
- an application program operating upon said computer, said program having a multiplicity of hierarchical operating or ordering levels corresponding to the hierarchical levels of the regions of said card.

30. The system as claimed in claim 29 further comprising a user interpretable output device wherein each time a region of said card is activated a user interpretable output is provided from said output device.

31. The system as claimed in claim 30 wherein said user interpretable output device is selected from the group consisting of a display device and a loudspeaker device.

32. The system as claimed in claim 29 wherein a plurality of said card readers are provided each in communication with said computer and each permitting a corresponding user to interface with said application program.

33. A method of interfacing at multiple levels between a user and an application program operating upon a computer, said application program having a multiplicity of hierarchical operating or ordering levels, said method comprising the steps of:
(a) providing said user with a smart card having a plurality of user activated regions on at least one surface thereof and an electronic memory with data stored therein corresponding to each of said regions;
(b) arranging said regions and said data in a hierarchy with a multiplicity of levels corresponding to said application program levels, each of said levels having a plurality of regions;
(c) providing said user with a smart card reader communicating with said computer,
(d) inserting said card into said smart card reader, and
(e) selecting a region of each said level in the sequence of said hierarchy to activate said stored data in said hierarchical sequence to operate said application program at the operating or ordering level corresponding to the last selected region.

34. The method as claimed in claim 33 comprising the further step of:
(f) physically locating the regions of each hierarchical level on said card in physically separated groups such that all regions within each group belong to the same hierarchy.

35. The method as claimed in claim 33 comprising the further step of:
(g) physically locating the regions of said card in physically separated groups such that each group has only one region of a first hierarchical level and at least one region of each of the remaining hierarchical levels.

36. A secure access device for interfacing between a user thereof and application program having a plurality of hierarchical operating levels and being operable by a computer, said secure access device comprising:
- a card portion having a surface on which are formed a plurality of user interpretable icons on at least one surface, there being at least one security icon associated with a security function for enabling access to at least one of said hierarchical operating levels, and at least one functional icon associated with each said hierarchical operating level, said functional icons being arranged into regions on said surface and associated with a corresponding one of said operating levels; and
- electronic apparatus associated with said card portion, said apparatus comprising:
- a memory comprising a mapping between each said icon and stored data associated therewith, at least each said security icon each having a corresponding stored character string;
- processor means coupled to said memory means; and
- communication means for coupling said processor means to said computer and a reading device, said reading device being configured to enable user selection of a function associated with a corresponding one of said icons;
- wherein said processor means is configured to relate reading signals generated from a user selection of at least one of said security icons and received via said communication means with at least one of said retained character strings to thus perform a secure access checking function for enabling or rejecting user access to at least one of said hierarchical operating levels;
- whereupon user selection of a said icon in a said region in a sequence of said hierarchy activates said stored data in said hierarchical sequence to operate said application program at the operating level corresponding to the last selected region.

37. A secure access device according to claim 36 comprising for each said operating level a plurality of said functional icons associated therewith.

38. A secure access device according to claim 37 wherein each said hierarchical operating level has associated therewith a corresponding said security icon and said secure access checking function is performed to enable access to each said hierarchical operating level.

39. A system for providing a service, said system comprising:
- a computer operating application program having a plurality of hierarchical operating levels
- a secure access device according to claim 36; and
- a reading device coupled to said computer and user operable to read data stored in said secure access device to permit user implementation of said service.

* * * * *

UNITED STATES PATENT AND TRADEMARK OFFICE
CERTIFICATE OF CORRECTION

PATENT NO.   : 6,804,786 B1
DATED        : October 12, 2004
INVENTOR(S)  : Cathryn Anne Chamley et al.

It is certified that error appears in the above-identified patent and that said Letters Patent is hereby corrected as shown below:

Title page,
Item [57], ABSTRACT
Line 28, "operate," should read -- operate --.

Column 7,
Line 16, "then" should read -- the --.

Column 9,
Line 33, "sine" should read -- since --;
Line 36, "five icons 120-128" should read -- five icons 120, 122, 124, 126 and 128 --;
Line 37, "Where" should read -- Where, --; and
Line 55, "in request" should read -- to a request --.

Column 10,
Line 41, "users" should read -- user's --; and
Line 59, "above described" should read -- above-described --.

Column 11,
Line 11, "In information" should read -- Information --;
Line 43, "Select" should read -- SELECT --; and
Line 50, "server 6" should read -- server 806 --.

Column 12,
Line 21, "cations" should read -- cation --.

Column 15,
Line 12, "icon 764" should read -- icon 1764 --; and
Line 19, "selected" should read -- selected, --.

Column 16,
Line 4, "strings said" should read -- strings, said --; and
Line 18, "means said" should read -- means, said --.

Column 18,
Line 6, "means said" should read -- means, said --; and
Line 38, "overly" should read -- overlie --.

UNITED STATES PATENT AND TRADEMARK OFFICE
CERTIFICATE OF CORRECTION

PATENT NO. : 6,804,786 B1
DATED : October 12, 2004
INVENTOR(S) : Cathryn Anne Chamley et al.

It is certified that error appears in the above-identified patent and that said Letters Patent is hereby corrected as shown below:

Column 19,
Line 17, "are selected form" should read -- selected from --;
Line 61, "computer," should read -- computer; -- ; and
Line 62, "reader," should read -- reader; --.

Column 20,
Line 61, "levels" should read -- levels; --.

Signed and Sealed this

Third Day of May, 2005

JON W. DUDAS
*Director of the United States Patent and Trademark Office*